(12) United States Patent
Minagawa

(10) Patent No.: US 7,778,416 B2
(45) Date of Patent: Aug. 17, 2010

(54) PRINT DATA COMMUNICATION WITH DATA ENCRYPTION AND DECRYPTION

(75) Inventor: Tomonori Minagawa, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 12/031,309

(22) Filed: Feb. 14, 2008

(65) Prior Publication Data
US 2008/0235512 A1    Sep. 25, 2008

Related U.S. Application Data

(62) Division of application No. 10/522,605, filed on Jan. 28, 2005, now abandoned.

(30) Foreign Application Priority Data

| Aug. 6, 2002 | (JP) | ............................. 2002-228950 |
| Jul. 25, 2003 | (JP) | ............................. 2003-280375 |

(51) Int. Cl.
*G09C 3/00* (2006.01)
*G09C 5/00* (2006.01)
*G06K 15/00* (2006.01)
*G06F 15/16* (2006.01)

(52) U.S. Cl. .................. 380/55; 358/1.14; 709/229

(58) Field of Classification Search ............. 358/1.14; 380/55
See application file for complete search history.

(56) References Cited

U.S. PATENT DOCUMENTS

| 5,633,932 | A | 5/1997 | Davis et al. ................ 713/176 |
| 6,061,448 | A | 5/2000 | Smith et al. ................ 380/21 |
| 6,290,349 | B1 | 9/2001 | Silverbrook et al. ........ 347/87 |
| 6,314,521 | B1 | 11/2001 | Debry ...................... 726/10 |
| 6,711,677 | B1 | 3/2004 | Wiegley .................... 713/151 |
| 6,789,194 | B1 | 9/2004 | Lapstun et al. ............ 713/176 |
| 6,862,583 | B1 | 3/2005 | Mazzagatte et al. ........ 705/64 |
| 6,978,299 | B1 | 12/2005 | Lodwick ................... 709/223 |
| 7,003,667 | B1 | 2/2006 | Slick et al. ................ 713/182 |
| 7,020,781 | B1 * | 3/2006 | Saw et al. .................. 705/51 |
| 7,093,046 | B2 | 8/2006 | Keeney et al. ............ 710/220 |
| 7,095,518 | B1 | 8/2006 | Keeney et al. ........... 358/1.115 |
| 7,103,182 | B2 | 9/2006 | Parry ....................... 380/51 |
| 7,215,437 | B2 | 5/2007 | Shima ................... 358/1.115 |
| 2001/0048533 | A1 | 12/2001 | Koana ..................... 358/1.15 |

(Continued)

FOREIGN PATENT DOCUMENTS

CN    1332405 A    1/2002

(Continued)

OTHER PUBLICATIONS

European Search Report on European Patent Appln. No. 03 76 6763 (Sep. 5, 2008).

*Primary Examiner*—Christian LaForgia
(74) *Attorney, Agent, or Firm*—Fitzpatrick, Cella, Harper & Scinto

(57) ABSTRACT

A printing job containing printing data is transmitted to a specified image forming apparatus through a communications medium so that the printing data can be printed by the specified image forming apparatus. The printing data is encrypted in an encrypting method specified for printing the printing job, the information about the destination for the image forming apparatus is obtained, and the information about the destination obtained by the obtaining means is decrypted by the disclosed method, apparatus, and medium.

12 Claims, 23 Drawing Sheets

PROCESS OF THE SERVER

U.S. PATENT DOCUMENTS

| | | |
|---|---|---|
| 2002/0042884 A1 | 4/2002 | Wu et al. .................... 713/201 |
| 2003/0014640 A1 | 1/2003 | Loyd ......................... 713/182 |
| 2003/0044009 A1 | 3/2003 | Dathathraya ................ 380/55 |
| 2003/0105963 A1 | 6/2003 | Slick et al. .................. 731/171 |
| 2004/0095595 A1* | 5/2004 | Jacobsen .................... 358/1.14 |
| 2004/0125402 A1* | 7/2004 | Kanai et al. ................. 358/1.15 |

FOREIGN PATENT DOCUMENTS

| | | |
|---|---|---|
| EP | 1 100 003 A2 | 5/2001 |
| EP | 1 197 828 A1 | 4/2002 |
| EP | 1 320 009 A2 | 6/2003 |
| JP | 06-044404 | 2/1994 |
| JP | 2001-186358 A | 7/2001 |
| JP | 2001-265687 A | 9/2001 |
| JP | 2002-7737 | 1/2002 |
| JP | 2002-14796 | 1/2002 |
| JP | 2003-152695 A | 5/2003 |
| JP | 2003-224561 | 8/2003 |
| JP | 2003-237186 | 8/2003 |
| KR | 2002-0016629 | 3/2002 |
| WO | WO 00/05642 | 2/2000 |

* cited by examiner

PROCESS OF THE PRINTER

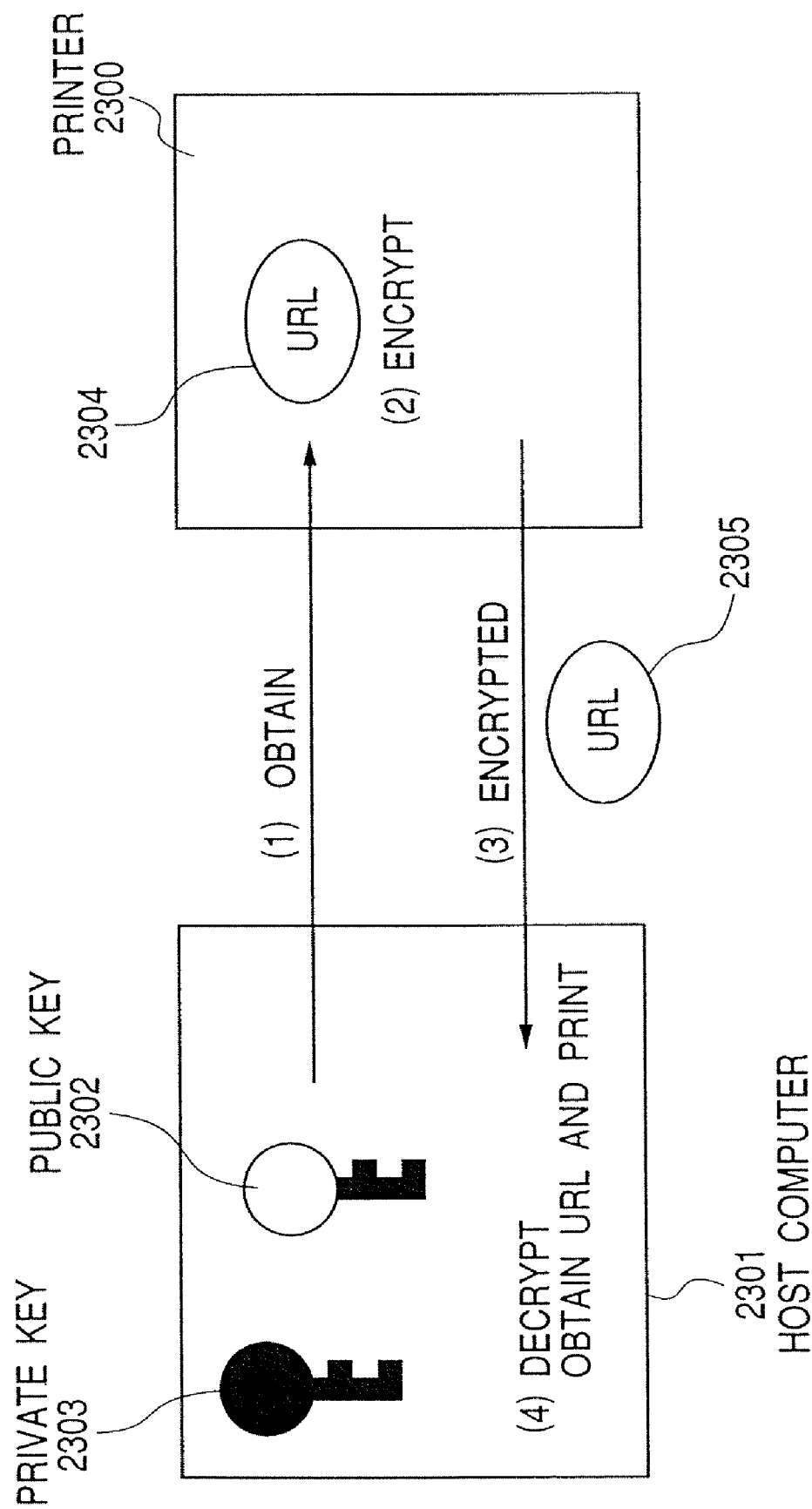

PRINT DATA COMMUNICATION WITH DATA ENCRYPTION AND DECRYPTION

RELATED APPLICATION

This application is a divisional of application Ser. No. 10/522,605, filed Jan. 28, 2005, the entire contents of which are incorporated herein by reference.

BACKGROUND OF THE INVENTION

1. Field of the Invention

The present invention relates to a print control apparatus, an image forming apparatus, an image forming apparatus management server, a print processing system, a print control method, a computer program, and a computer-readable recording medium, and is more specifically suitable for printing data via a communications medium such as the Internet and a network, etc.

2. Related Background Art

Methods of acquiring and printing data on a printer (an example of an image forming apparatus) from a host computer includes: a stand-alone connection methods in which the host computer and the printer are directly connected with each other through a cable; and a network connection method in which the host computer and the printer are connected with each other through a network so that the network connection allows the use of the remote printer.

Among these methods, the network printing for printing data through a network using the above-mentioned network connection has an advantage of printing on another printer connected to a network (Internet). The network printing also has an advantage of allowing a plurality of terminal devices to share large high-speed printers and expensive color printers, and that of printing data on a remote printer as described above. These advantages promote the use of network printing explosively.

SUMMARY OF THE INVENTION

However, networks and the Internet are used by an unlimited number of users, and it is not so difficult for a third party to tap the printing data travelling through the networks and Internet when the third party intends to.

For example, when important data such as securities or confidential data is printed on a printer in a client site connected to the Internet, or a salesman prints such data using a printer near a visiting site, it is undesired that the printing data can be tapped, falsified before reaching the printer, or printed on a wrong printer other than the printer specified by the printer driver.

However, in the conventional technology, there has been the problem that printing data can be tapped and used by a third party when data can be printed through a communications medium such as a network, Internet, etc.

The present invention has been developed to solve the above-mentioned problems. As a first aspect of the present invention, even if printing data is tapped when it is printed through a communications medium such as a network, Internet, etc., the tapped data can be protected from being used by a third party. Furthermore, as a second aspect of the present invention, even if printing data is tapped and falsified when it is printed through a communications medium such as a network, Internet, etc., the tapping or the falsification can be detected to protect data against illegal printing.

Additionally, as a third aspect of the present invention, when a port, a URL, or other information that are suitable examples of destination of a printer is obtained from a printer management server through a network and Internet, the information about the print destination data is protected against tapping.

Other features and advantageous of the present invention will be apparent from the following description taken in conjunction with the accompanying drawings, in which like reference characters designate the same or similar parts throughout there of.

BRIEF DESCRIPTION OF THE DRAWINGS

FIG. 23 shows an embodiment of the present invention in reference to the encrypting process on the information about a destination.

DESCRIPTION OF THE PREFERRED EMBODIMENTS

First Embodiment

The first embodiments of the print control apparatus, the printer, the printer management server, the print processing system, the print control method, the computer program, and the computer-readable recording medium according to the present invention are described below by referring to the attached drawings.

Figure 1:
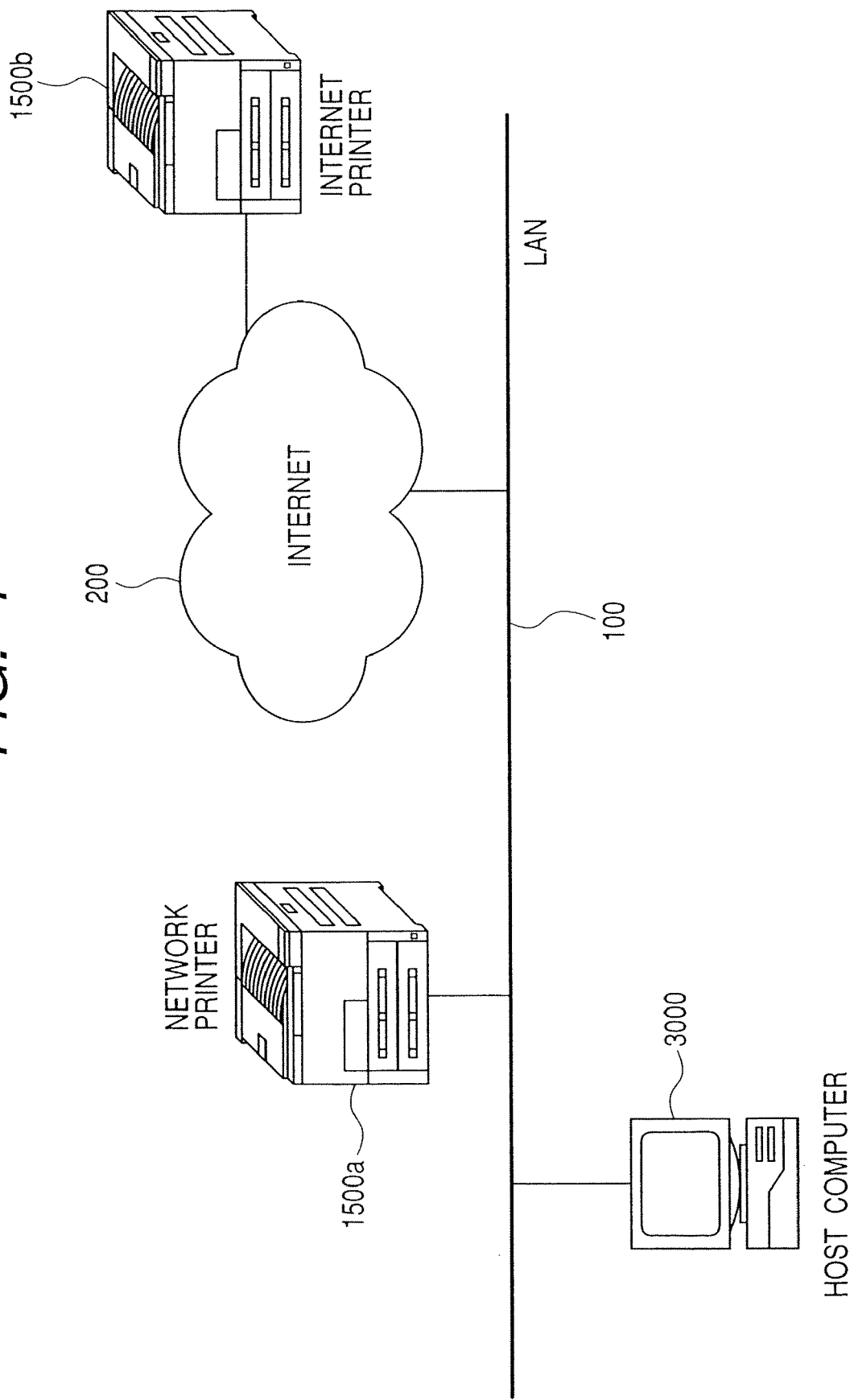
FIG. 1 shows the concept of the first embodiment of the present invention in reference to an example of the configuration of the print processing system.

FIG. 1 shows the concept of the first embodiment of the present invention in reference to an example of the configuration of the print processing system.

In the embodiments of the present invention, the user operates a print instruction from a host computer 3000 mounted as a print control apparatus, and considers a case in which data is printed on a network printer 1500a shared over a network (LAN) 100 and an Internet printer 1500b connected through Internet 200. In addition to the printers, an example of an image forming apparatus can be a scanner, a facsimile, a digital camera, and a composite machine (multifunction peripheral device) provided with the functions of a copy machine, a printer, a facsimile, a scanner, etc.

Figure 2:
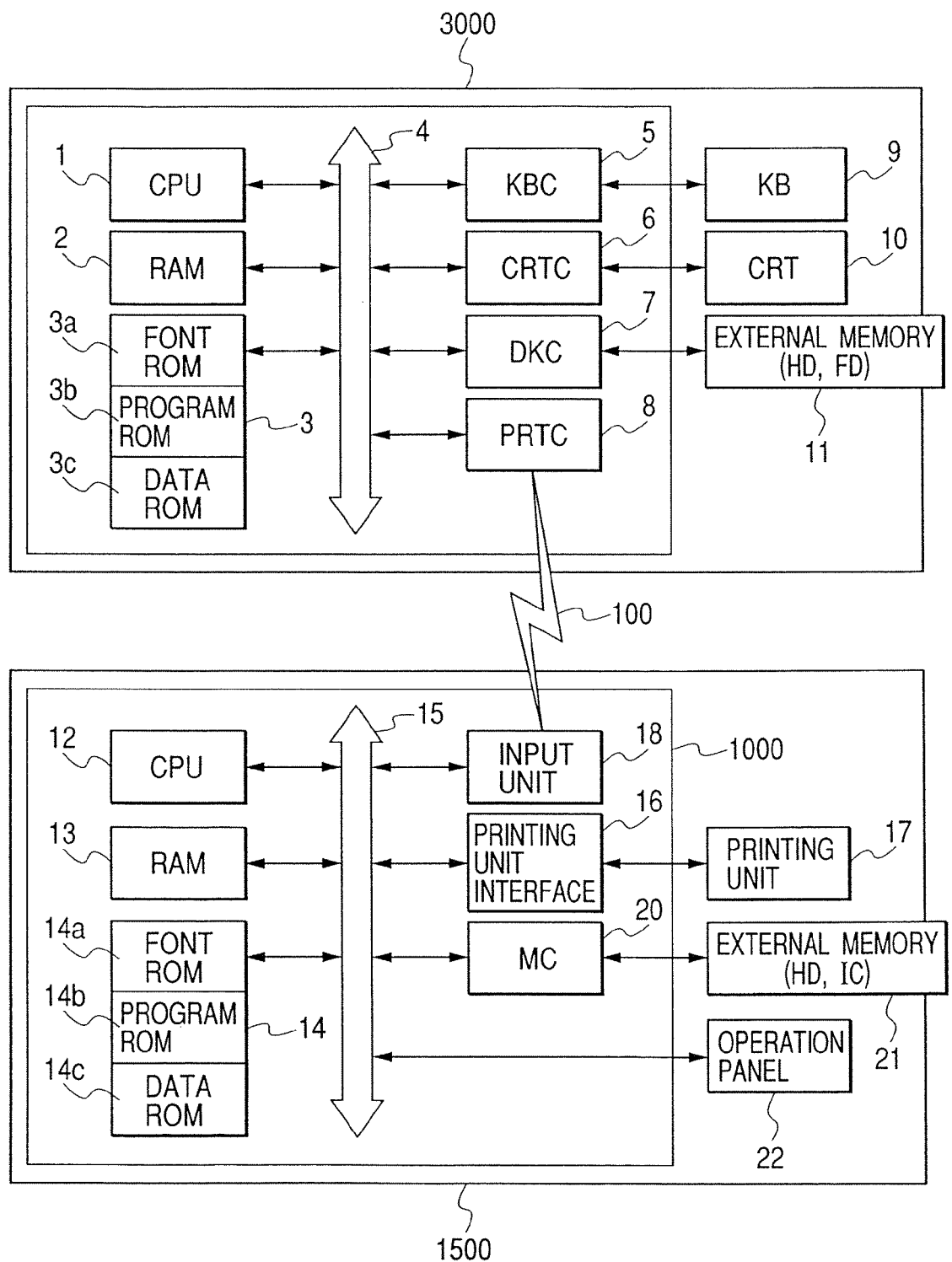
FIG. 2 is a block diagram of the first embodiment of the present invention in reference to an example of the configuration of the print processing system.

FIG. 2 is a block diagram of the first embodiment of the present invention in reference to an example of the configuration of the print processing system.

Unless otherwise specified, the host computer 3000 is connected to a printer 1500 (network printer 1500a and Internet printer 1500b) through a LAN, a WAN, a public circuit, the Internet, and any other means (communications medium).

In FIG. 2, the host computer 3000 includes a CPU 1 for processing a document containing graphics, images, characters, tables (including spreadsheets, etc.), etc. in a mixed manner according to the document processing program, etc. stored in program ROM of ROM 3 or in external memory 11, and centrally controls each of the devices 2 to 8 connected to a system bus 4.

Program ROM 3b of the ROM 3 or the external memory 11 also stores an operating system program (OS), etc. which is the control program of the CPU 1. Font ROM 3a of the ROM 3 or the external memory 11 stores font data, etc. for use in the above-mentioned document processing. Additionally, data ROM 3c of the ROM 3 or the external memory 11 stores various data for use in performing the above-mentioned document processing.

RAM 2 functions as main memory, a work area, etc. of the CPU 1.

A keyboard controller (KBC) 5 controls the key input from a keyboard 9 or a pointing device not shown in the attached drawings.

A CRT controller (CRTC) 6 controls the display of a CRT display (CRT) 10.

A disk controller (DKC) 7 controls the access to the hard disk (HD) and the external memory 11 such as a flexible disk (FD), etc. storing a boot program, various applications, font data, a user file, an editing file, a printer control command generation program (hereinafter referred to as a printer driver), etc.

A printer controller (PRTC) 8 is connected to the printer 1500 through the network 100, and performs a controlling process on the bidirectional communications with the printer 1500. The printer controller 8 can add a command depending on a connection protocol to a printing job when the printing job is transmitted to the printer 1500. The command can also be automatically added by the operating system program (OS).

The CPU 1 performs the rasterization on the outline font in the display information RAM set in the RAM 2, and enables WYSIWYG on the CRT 10.

The CPU 1 opens various windows recorded according to the command indicated by the mouse cursor, etc. not shown in the attached drawings on the CRT 10, and performs various types of data processing. Before performing print processing, the user opens the window for print settings. Then, the user sets a printing process for a printer driver including setting a printer, selecting a printing mode, etc. using the opened window.

In the printer 1500, a printer CPU 12 has the function of outputting an image signal as output information to a printing unit 17 (printer engine) through a printing unit interface (printing unit I/F) 16 connected to a system bus 15 according to the control program, etc. stored in the program ROM of ROM 14 or the control program, etc. stored in external memory 21.

Program ROM 14b of the ROM 14 stores a control program, etc. of the printer CPU 12. Font ROM 14a of the ROM 14 stores font data, etc. for use in generating the output information. Data ROM 14c of the ROM 14 stores the information, etc. for use by the host computer 3000 on a printer having no external memory 21 such as a hard disk, etc.

The printer CPU 12 can communicate with the host computer 3000 through an input unit 18, and can notify the host computer 3000 of the information, etc. in the printer 1500.

The data received from the printer driver is stored in RAM 13, and converted into an image signal by the control program. A command added depending on the communications protocol is interpreted also by the control program.

The RAM 13 is a recording medium functioning as the main memory, a work area, etc. of the printer CPU 12, and is configured such that its memory capacity can be extended by the optional RAM connected to the extension port not shown in the attached drawings. The RAM 13 is used as an output information expansion area, environment data storage area, NVRAM (non-volatile RAM), etc.

The above-mentioned hard disk (HD) and external memory 21 such as an IC card, etc. are access-controlled by a memory controller (MC) 20. The external memory 21 is connected as an optional unit, and stores font data, an emulation program, form data, etc.

An operation panel 22 is provided with switches for operations, an LED indicator, a liquid crystal panel, etc. Additionally, the above-mentioned external memory 21 is not limited to one unit, but can include at least one or more memory units. The memory can also be configured to be provided with, in addition to built-in fonts, an optional font card, and a plurality of external memory units storing a program for interpretation of printer control languages of different types. Furthermore, the memory can include NVRAM not shown in the attached drawings to store printer mode setting information from the operation panel 22.

Figure 3A:
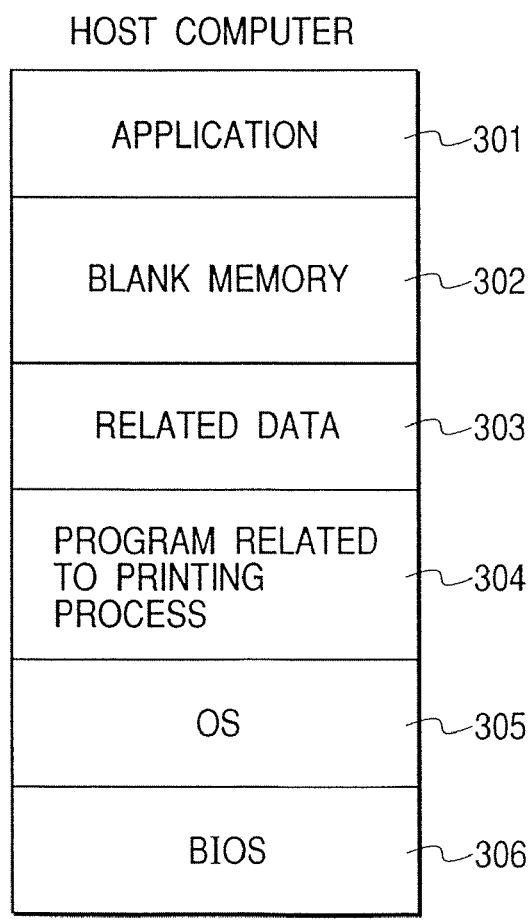
FIGS. 3A and 3B show the first embodiment using a memory map of RAM.
Figure 3B:
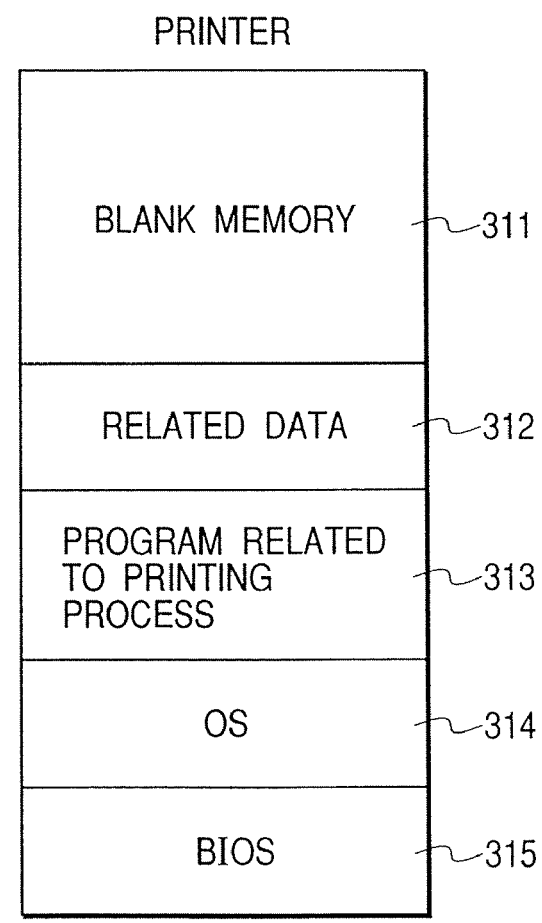

FIG. 3A is a memory map showing the control program which is stored in the program ROM 3b of the host computer 3000 according to the embodiment of the present invention, and becomes executable after it is loaded to the RAM 2 of the host computer 3000.

The encryption, a data feature amount computation function, etc. for use in the host computer 3000 according to the embodiment of the present invention are resident as a part of a program 304 related to a printing process. A public key of a printer designated for printing and a private key of a printer driver itself are resident as a part of a related data 303.

Figure 13C:
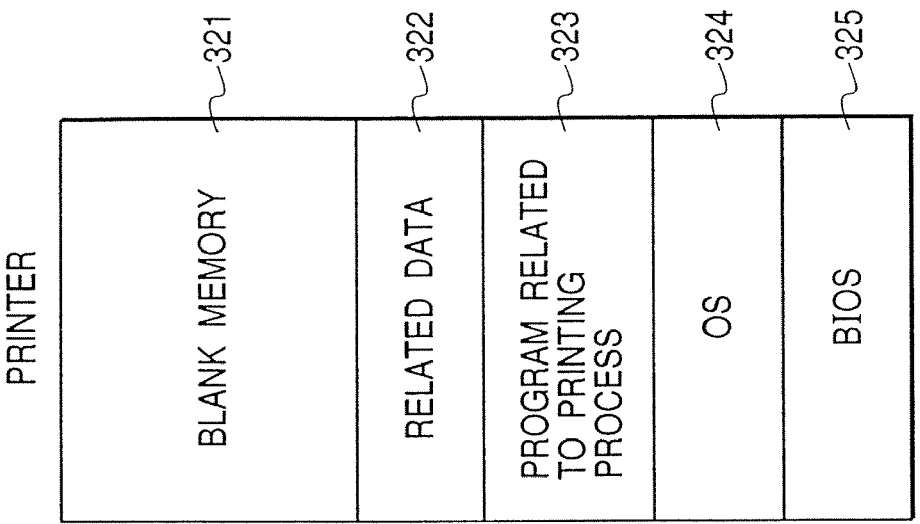
FIGS. 13A, 13B and 13C show the fourth embodiment using a memory map of RAM.
Figure 13B:
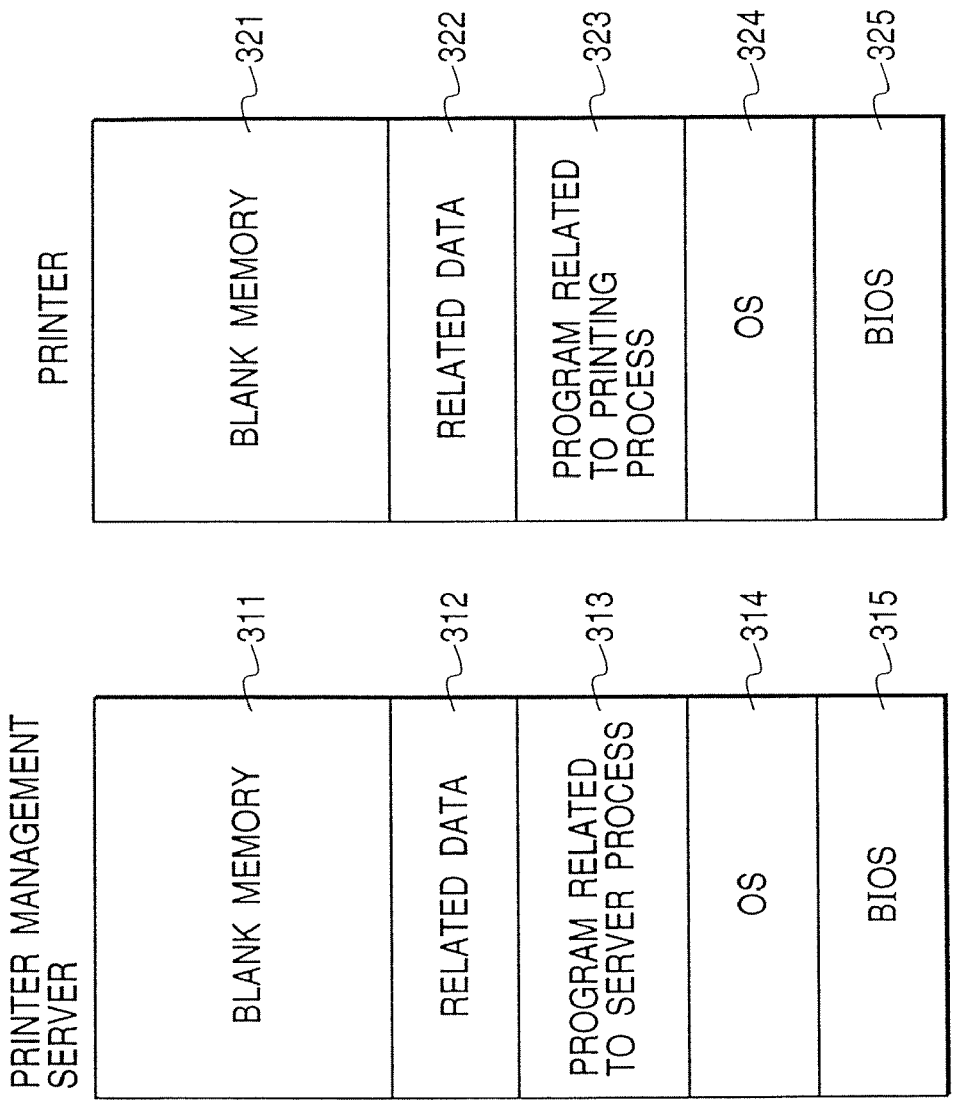

FIG. 13B is a memory map showing the control program which is stored in the program ROM 14b of the printer 1500 according to the embodiment of the present invention, and becomes executable after it is loaded to the RAM 13 of the printer 1500.

The decryption, a data feature amount computation function, etc. for use in the printer 1500 according to the embodiment of the present invention are resident as a part of a program 313 related to a printing process. A public key of a specific printer driver and a private key of a printer itself are resident as a part of a related data 312.

Figure 4:
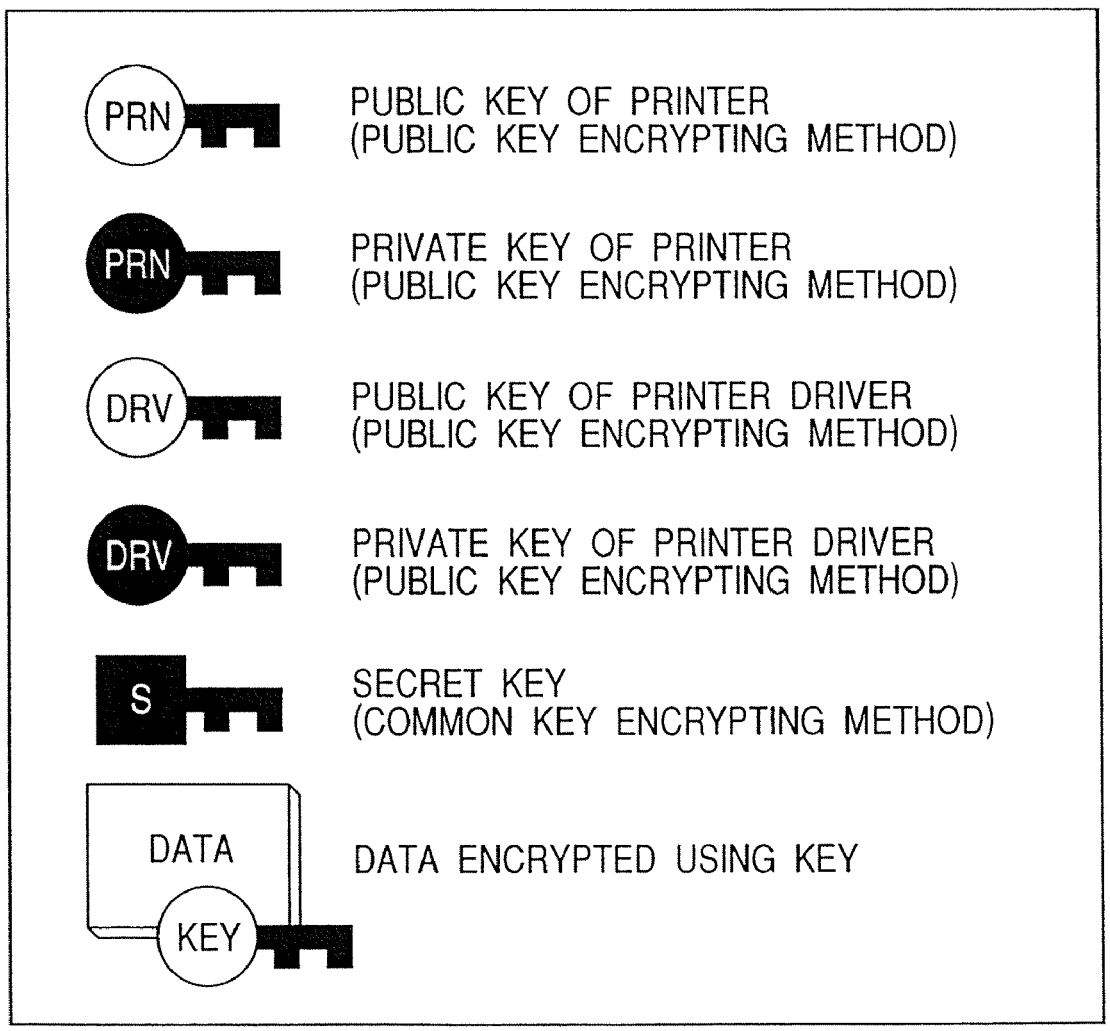
FIG. 4 shows the first embodiment of the present invention by explaining an encryption key used in the print processing system.

FIG. 4 shows the encryption key for use in the print processing system (refer to the flowcharts shown in and after FIG. 5) according to the embodiment of the present invention. In the embodiment, the encryption is realized by the public key cryptosystem and the conventional encryption system, and each information equipment has its own public key and private key. Therefore, FIG. 4 clearly shows the respective keys.

In FIG. 4, the picture showing the key overriding the data indicates that the data is encrypted by the corresponding key.

In the print processing system according to the embodiment of the present invention, the printing process cannot be performed on any printers other than the specified printer by transmitting printing data encrypted in the public key cryptosystem.

The public key cryptosystem is a method in which the encryption and the decryption are realized using different keys (private key and public key) between a user and the user's communication partner, and data encrypted using one key cannot be decrypted without using the other key.

In the public key cryptosystem, the public key is normally published, and the private key is kept in secret. In the public key cryptosystem, it is not necessary to prepare a specific key for each communication partner, and a public key can be published. Therefore, a key can be easily transmitted to a communication partner with a person who can decrypt the key limited to the user.

If the public key cryptosystem is applied to, for example, the printer 1500 according to the present embodiment, and the printing data is encrypted using the published public key of the printer, then the data can be printed only on the destination printer with the printing data transmitted from any printer driver, thereby disabling the other printers to print the data.

The process of a printer driver generating an encrypted printing job is described below in detail by referring to the process flow shown in FIG. 5.

Upon receipt of a print request from an application, the printer driver of the host computer 3000 encrypts the printing data using the public key of the destination printer 1500 (step S501).

Then, the encrypted printing data is transmitted as a printing job to the printer 1500.

The public key of the printer 1500 is published, and the printer driver selects the public key of the destination printer 1500 for use.

Figure 6:
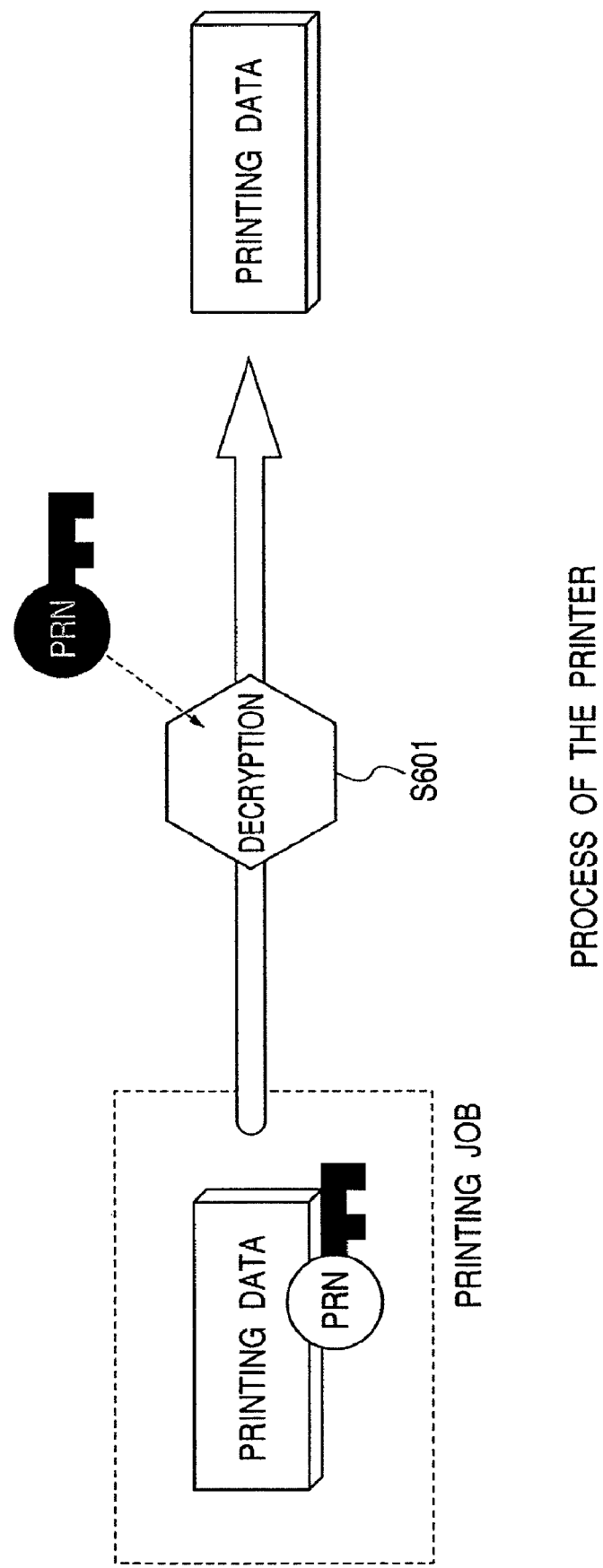
FIG. 6 shows the first embodiment of the present invention in reference to a flowchart of the process of the printer.

The process of the printer 1500 obtaining printing data from the received printing job is described below in detail by referring to the process flow shown in FIG. 6.

The printer 1500 decrypts the printing data in the received printing job using the private key of the printer 1500 (step S601), and obtains the printing data.

As described above, the private key of the printer 1500 is held by the printer 1500 as an unpublished key.

When an unspecified printer tries to print the printing data, the printing data is encrypted, and cannot be decrypted or printed as is. Furthermore, since only the specified printer 1500 has the key to decrypt the encrypted data, the other printers cannot decrypt the data. Therefore, in the print processing system according to the embodiment of the present invention, although printing data is tapped on the network 100, the printing data can be protected against printing on the other printers.

Second Embodiment

The second embodiments of the print control apparatus, the printer, the printer management server, the print processing system, the print control method, the computer program, and the computer-readable recording medium according to the present invention are described below. The configuration of the hardware of the print processing system according to the present embodiment is similar to the configuration of the above-mentioned first embodiment. Therefore, the same components as those in the first embodiment are assigned the same reference numerals shown in FIGS. 1 to 6, and the detailed explanation is omitted here.

In the first embodiment, the print processing system can protect printing data against printing on other printers even if the printing data is tapped.

Figure 5:
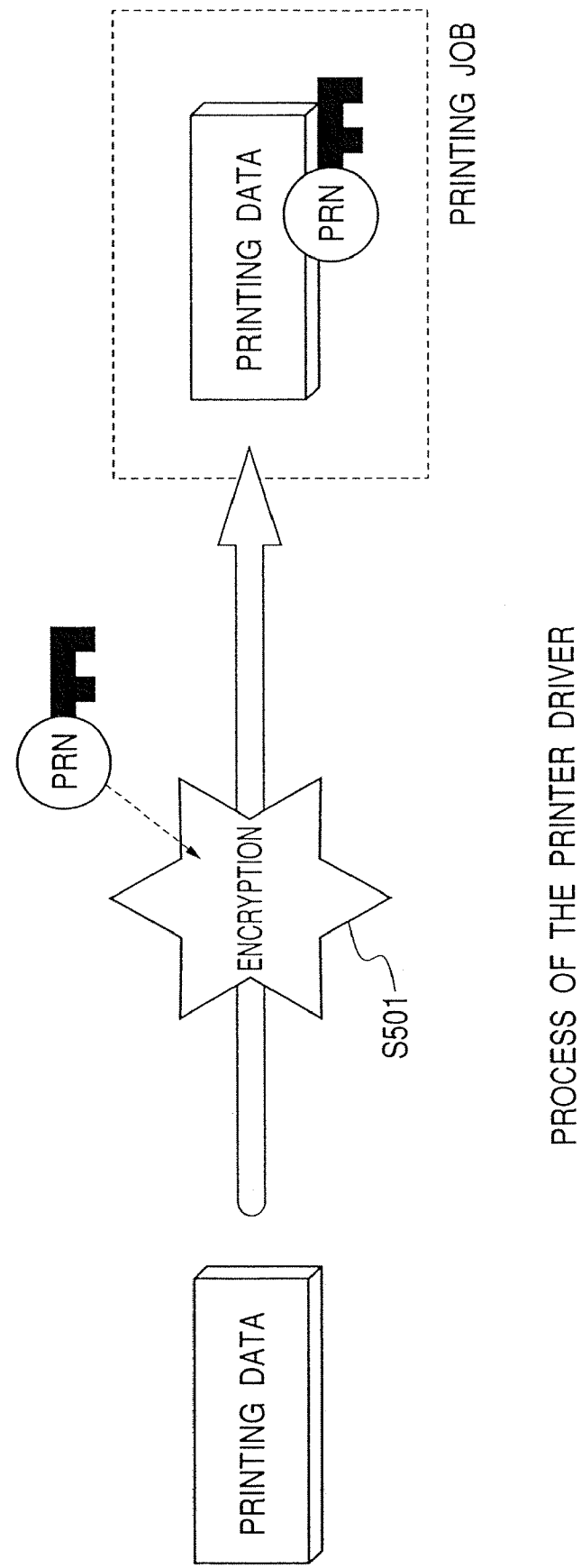
FIG. 5 shows the first embodiment of the present invention in reference to a flowchart of the process of the printer driver.

However, since the public key of the printer 1500 is published, the printer 1500 cannot determine whether or not printing data has been falsified when anybody hooks the original printing data and transmits different data to the printer 1500 through the same steps as the process shown in FIG. 5. This may cause a serious problem when the printing data if an estimate, securities, etc.

Therefore, in the printing process according to the present embodiment, the presence/absence of the falsification can be checked by a printer by receiving a printing job with a digital signature added to printing data.

A digital signature is obtained by encrypting the computed feature amount of the contents of printing data using a private key of a printer driver of the host computer 3000. The printer has a built-in public key of a specific printer driver, and uses it in decrypting and checking the digital signature.

The feature amount of the contents of the printing data is represented by a hash value, a checksum, etc. A hash value is computed using a hash function which is hardly obtained from a computation result or is hardly falsified to obtain the same hash value.

Figure 7:
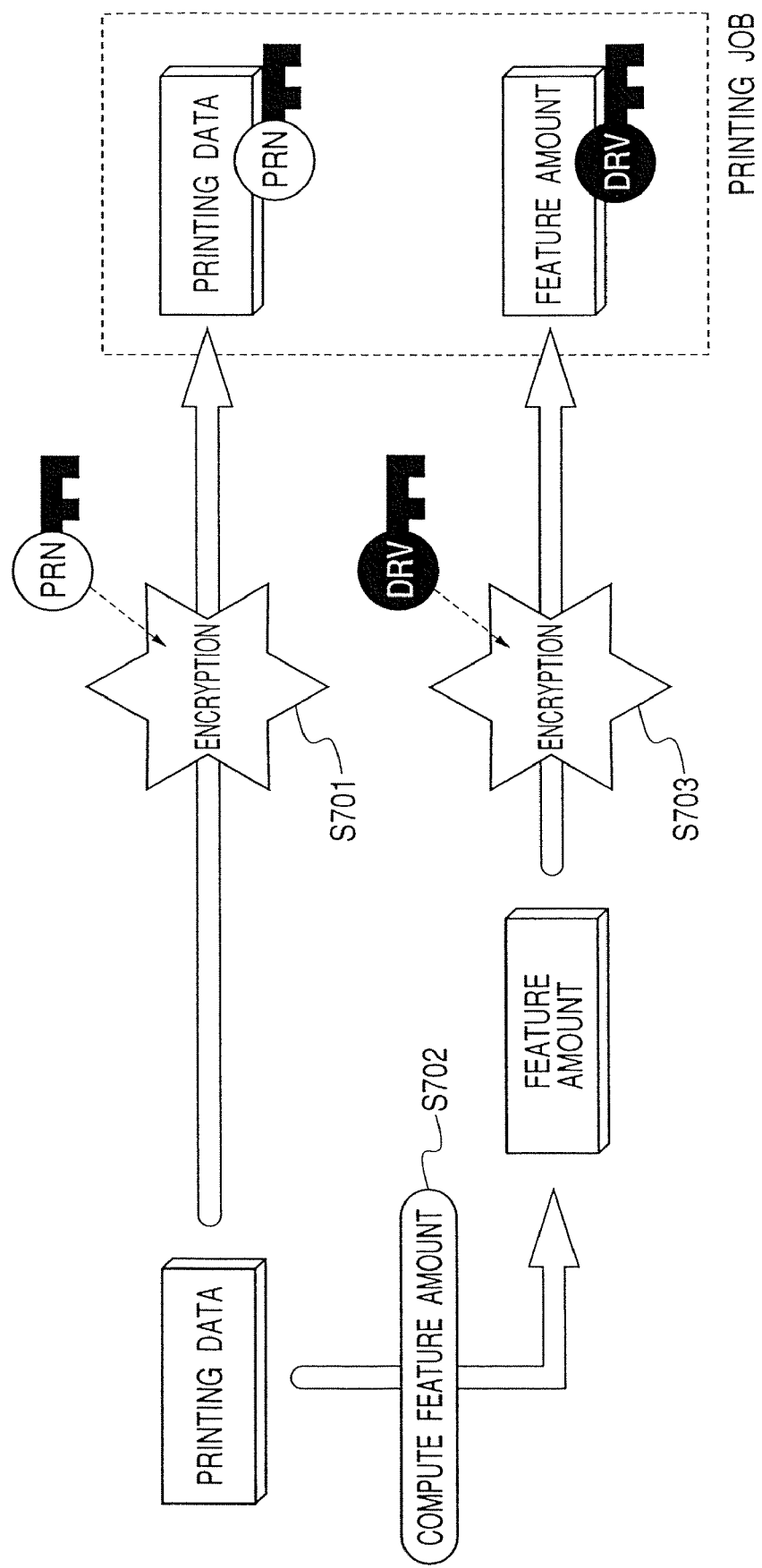
FIG. 7 shows the second embodiment of the present invention in reference to a flowchart of the process of the printer driver.

The process of a printer driver of a host computer according to the present embodiment generating an encrypted printing job is described below in detail by referring to the process flow shown in FIG. 7.

Upon receipt of printing data at a print request from an application, the printer driver of the host computer encrypts the printing data using a public key of the destination printer (step S701).

Then, a feature amount is computed from the original non-encrypted printing data using a feature amount computation function (step S702), and the feature amount is encrypted using a private key of the printer driver (step S703). The result is used as a digital signature. Then, the host computer transmits a combination of the encrypted printing data and the digital signature as a printing job to the printer for printing the printing data.

Figure 8:
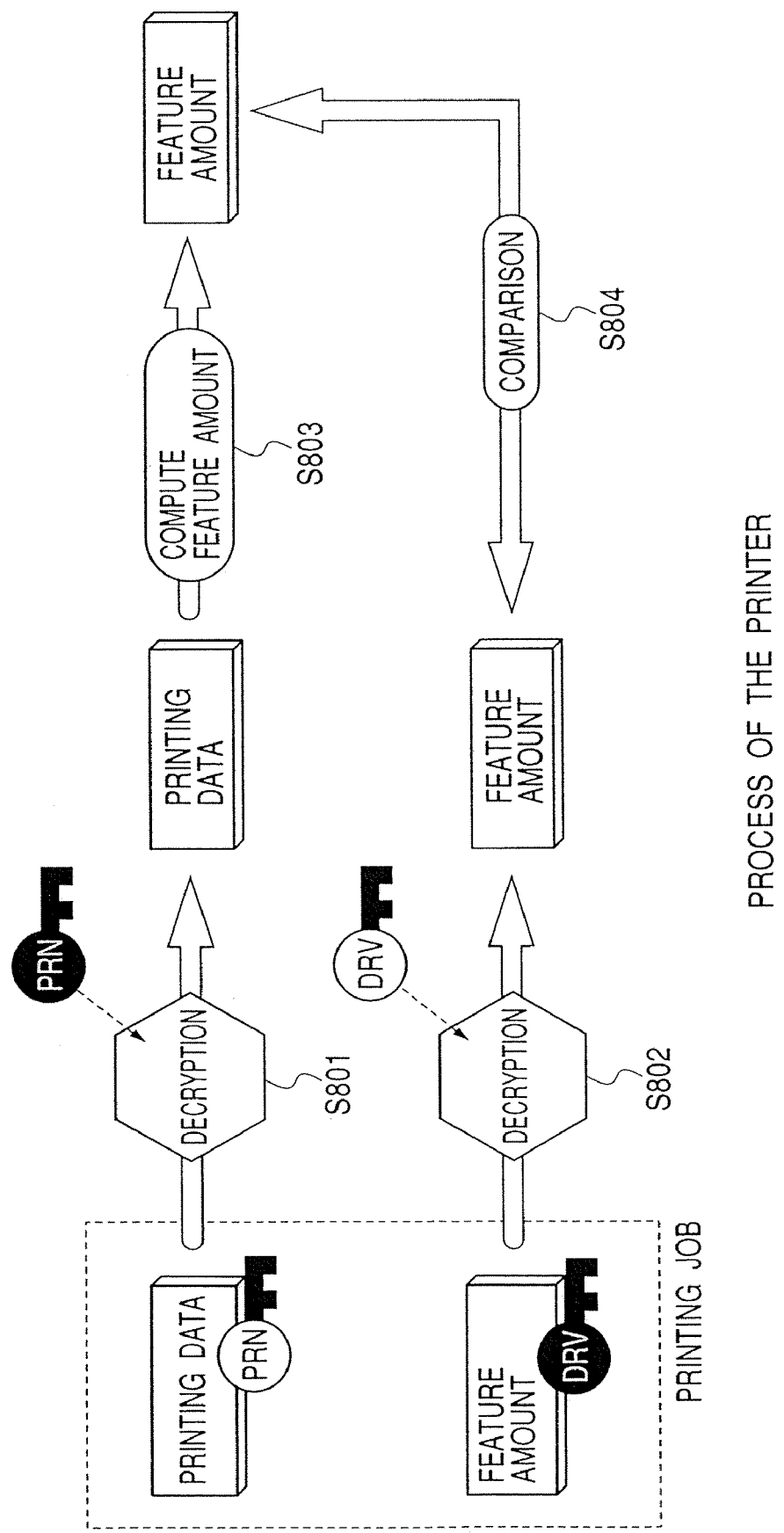
FIG. 8 shows the second embodiment of the present invention in reference to a flowchart of the process of the printer.

The process of a printer according to the present embodiment obtaining printing data from a received printing job is described below in detail by referring to the process flow shown in FIG. 8.

The printer decrypts the printing data in the received printing job using the private key of the printer (step S801) to obtain the printing data. Then, it decrypts the digital signature in the printing job using the public key of the source printer driver (step S802) to obtain the feature amount of the obtained printing data.

Then, the printer computes the feature amount from the obtained printing data using a feature amount computation function (step S803), compares the feature amount with the feature amount of the received printing data (step S804), and confirms that the obtained printing data in step S801 is not falsified if the feature amounts match each other.

If the feature amount computed by the printer does not match the feature amount of the received printing data in the process in step S804, the following condition can be assumed.

That is, there can be a case in which printing data cannot be decrypted using the public key of a specific printer driver, and the source of the received printing data is different from the correct host computer, and a case in which the computed feature amount of the printing data is different from the feature amount of the received printing data, thereby indicating the falsification of the printing data. In each case, the printing job has not been correctly transmitted.

In the print processing system according to the present embodiment, illegal printing data can be detected by a printer. When the illegal printing data is detected, the illegal printing data is not output after the detection, and the host computer is notified of the reception of the illegal printing data which is an effective countermeasure.

In the present embodiment, the body of the printer has a feature amount computation function common to the printer driver. Furthermore, it is assumed that a public key of a specific printer driver (or host computer) has been recorded in advance in the body of the printer.

The encryption key specific to a printer driver is not limited to a printer driver, but can be replaced with an encryption key specific to the host computer 3000 or the current user.

For example, when the encryption key is specific to the host computer 3000, the host computer 3000 can be used in the multi-user mode so that all user using the host computer 3000 can print the printing data on the printer 1500 on the same conditions.

When an encryption key is specific to a user, the printing data can be printed on the same conditions by a desktop personal computer in a company and a notebook personal computer (PC) out in the field.

Thus, only one public key can be recorded in the printer in any case in which an encryption key is specific to a printer driver, the host computer 3000, or a user.

Third Embodiment

The third embodiments of the print control apparatus, the printer, the printer management server, the print processing system, the print control method, the computer program, and the computer-readable recording medium according to the present invention are described below. The configuration of the hardware of the print processing system according to the present embodiment is similar to the configurations of the above-mentioned first and second embodiments. Therefore, the same components as those in the first and second embodiments are assigned the same reference numerals shown in FIGS. 1 to 8, and the detailed explanation is omitted here.

In the above-mentioned first and second embodiments, printing data is protected against tapping or falsification of the tapped printing data so that the printer driver can be printed with the security of the printing data improved.

However, since the encryption and decryption of the printing data in the above-mentioned public key cryptosystem requires a long processing time, it is not desired to apply the method to printing data of a large size.

Therefore, in the present embodiment, the conventional encryption system which is much higher in performance (requires much shorter processing time) than the public key cryptosystem is described.

The conventional encryption system refers to a method of encryption and decrypting data using the same key (secret key) between a user and its partner. Practically, data is encrypted by replacing or shifting a bit string of a sentence with another bit string according to a rule represented by a secret key.

The processing of the conventional encryption system is considered to be several hundred times faster than the complicated process of the public key cryptosystem having the feature that it is difficult to perform prime factorization when the value obtained by multiplying prime numbers, or that it is difficult to estimate a value in an oval curve into which the value has been input.

However, on the other hand, it is necessary to pass a secret key in a safe method to each partner, and to prepare a secret key specific to each partner.

In the present embodiment, the public key cryptosystem is combined with the conventional encryption system to encrypt printing data using a secret key, and pass the secret key to a printer using a public key.

Figure 9:
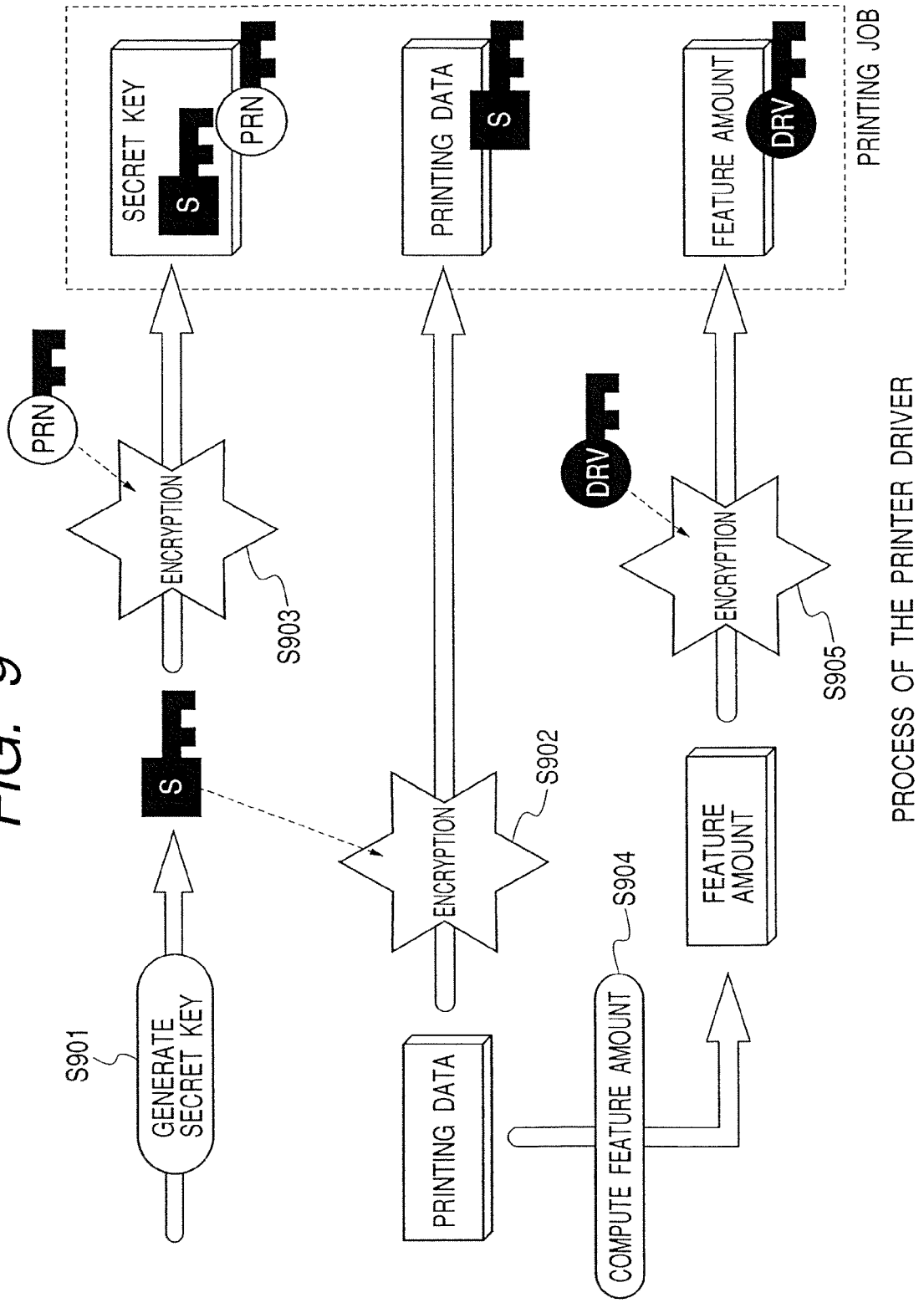
FIG. 9 shows the third embodiment of the present invention in reference to a flowchart of the process of the printer driver.

The process of a printer driver generating an encrypted printing job is described below in detail by referring to the process flow shown in FIG. 9.

Upon receipt of the printing data at a print request from an application, the printer driver of a host computer first generates a secret key (step S901), and encrypts the received printing data using the generated secret key (step S901). The generated secret key is encrypted using the public key of the printer (step S903).

Then, the feature amount is computed from the original non-encrypted printing, data using a feature amount computation function (step S904), and the feature amount is encrypted using the private key of the printer driver (step S905). The result is a digital signature.

Then, the host computer transmits a combination of the printing data encrypted using the secret key, the secret key encrypted using the public key of the printer, and the digital signature as a printing job to the printer.

Figure 10:
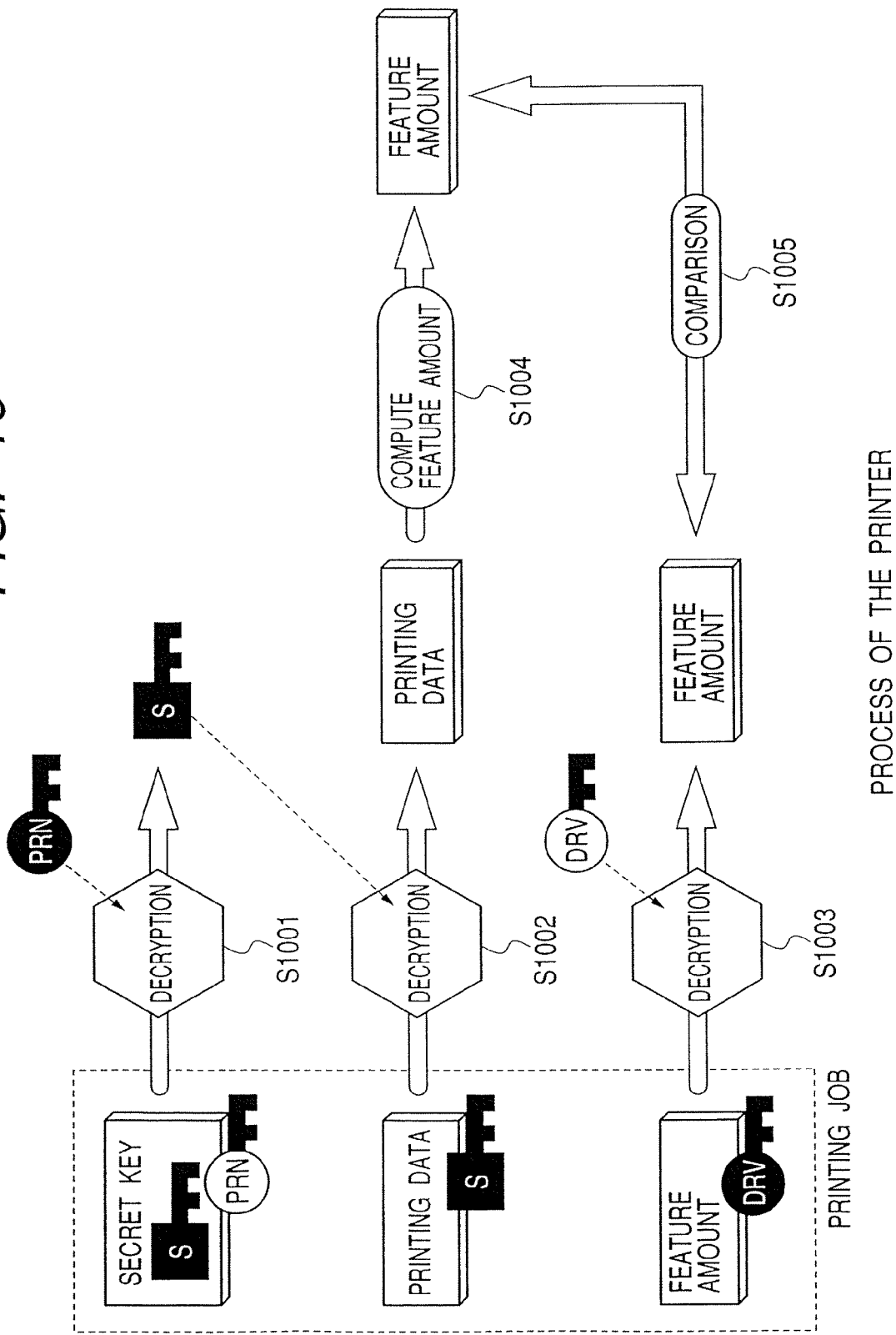
FIG. 10 shows the third embodiment of the present invention in reference to a flowchart of the process of the printer.

The process of the printer obtaining printing data from a received printing job is described below in detail by referring to the process flow shown in FIG. 10.

The printer decrypts the received secret key in the printing job using the private key of the printer (step S1001), and obtains the secret key in the printing job.

Then, the printing data in the printing job is decrypted using the obtained (decrypted) secret key (step S1002), and the printing data is obtained.

The digital signature of the printing job is decrypted using the public key of the source printer driver (step S1003), and the feature amount of the printing data is obtained.

From the obtained printing data, the body of the printer computes the feature amount using a feature amount computation function (step S1004), the computed feature amount is compared with the received feature amount of the printing data (step S1005). If the feature amounts match each other, it is confirmed that the obtained printing data in step S1002 has not been falsified.

Thus, according to the present embodiment, a time consuming public key cryptosystem is only used in the encryption and decryption of a secret key, and it is not necessary to manage a secret key for each of a plurality of printers connected to the network and Internet. Furthermore, since the host computer can change the secret key each time communications are established, the printing data can be more safely transmitted to a printer.

Fourth Embodiment

The fourth embodiments of the print control apparatus, the printer, the printer management server, the print processing system, the print control method, the computer program, and the computer-readable recording medium according to the present invention are described below.

In the above-mentioned first to third embodiments of the present invention, the printing data can be protected against tapping by encrypting the printing data by means capable of decrypting the data only by a specified printer, and the printing data can be protected against falsification by adding a digital signature (obtained by the source of the printing data encrypting the feature amount of the printing data using its own private key, and the falsification of the data can be detected by confirming the contents by the decryption using the public key of the source) to the printing data.

However, in the method described in the above-mentioned first to third embodiments, the host computer (or the printer driver) has to be informed of the public keys of all printers which can be specified. Similarly, the public keys of all printer drivers have to be recorded in the body of the printer.

Therefore, a large print processing system capable of using a plurality of host computers and printers requires laborious operations in recording and maintaining necessary information.

In this situation, the present embodiment maintains the system of safely transmitting printing data through the Internet and network using the print processing system described in the above-described first to third embodiments, the printer management server centrally manages the necessary information about the public keys of printers, etc., and the printer driver obtains necessary information from the printer management server, thereby eliminating the necessity to manage the information about each printer. The print processing system with the above-mentioned configuration is described below.

Thus, the configuration of the hardware of the print processing system according to the present embodiment is designed by adding a printer management server to the print processing system described by referring to the first to third embodiments of the present invention. Therefore, the components also included in the first to third embodiments are assigned the same reference numerals as in FIGS. 1 to 3, and the detailed explanation is omitted here.

Figure 11:
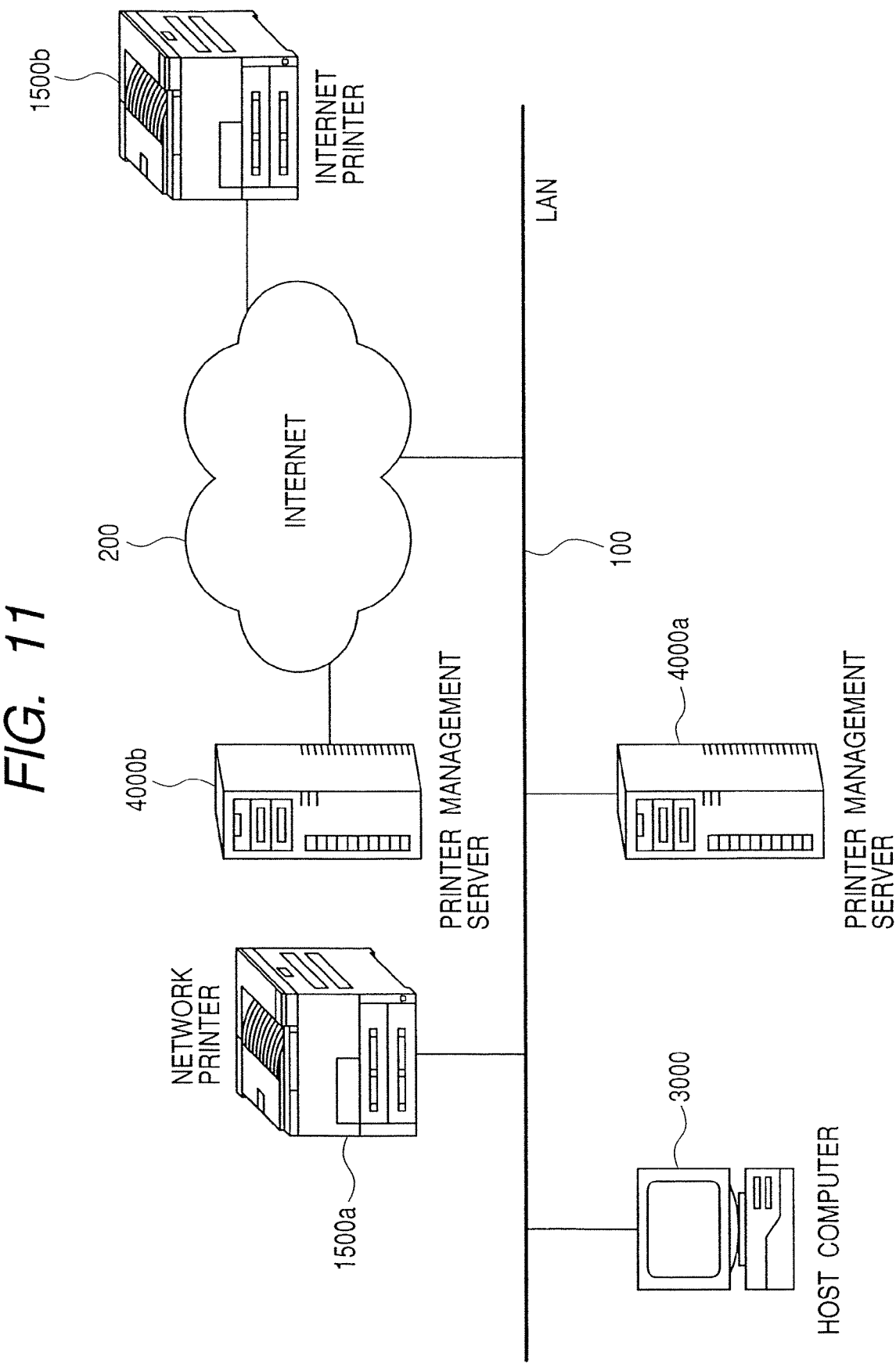
FIG. 11 shows the concept of the fourth embodiment of the present invention in reference to an example of the configuration of the print processing system.

FIG. 11 shows the concept of the fourth embodiment of the present invention in reference to an example of the configuration of the print processing system.

It is assumed that a user operates a print instruction from the host computer 3000, and the network printer 1500a shared on the network (LAN) 100 and the printer 1500b connected through the Internet 200 perform printing processes.

A printer management server 4000 (4000a, 4000b) manages the information (a setting position, an address, an encryption key, etc.) about possible printers, and the host computer 3000 obtains the information about necessary printer from the printer management server 4000 during printing, and transmits printing data to the corresponding printer.

The print processing system according to the present embodiment can also transmit printing data to the printers 4000a and 4000b through the printer management server 4000. The printer management server 4000 can be connected to network 100 or the Internet 200.

Figure 12:
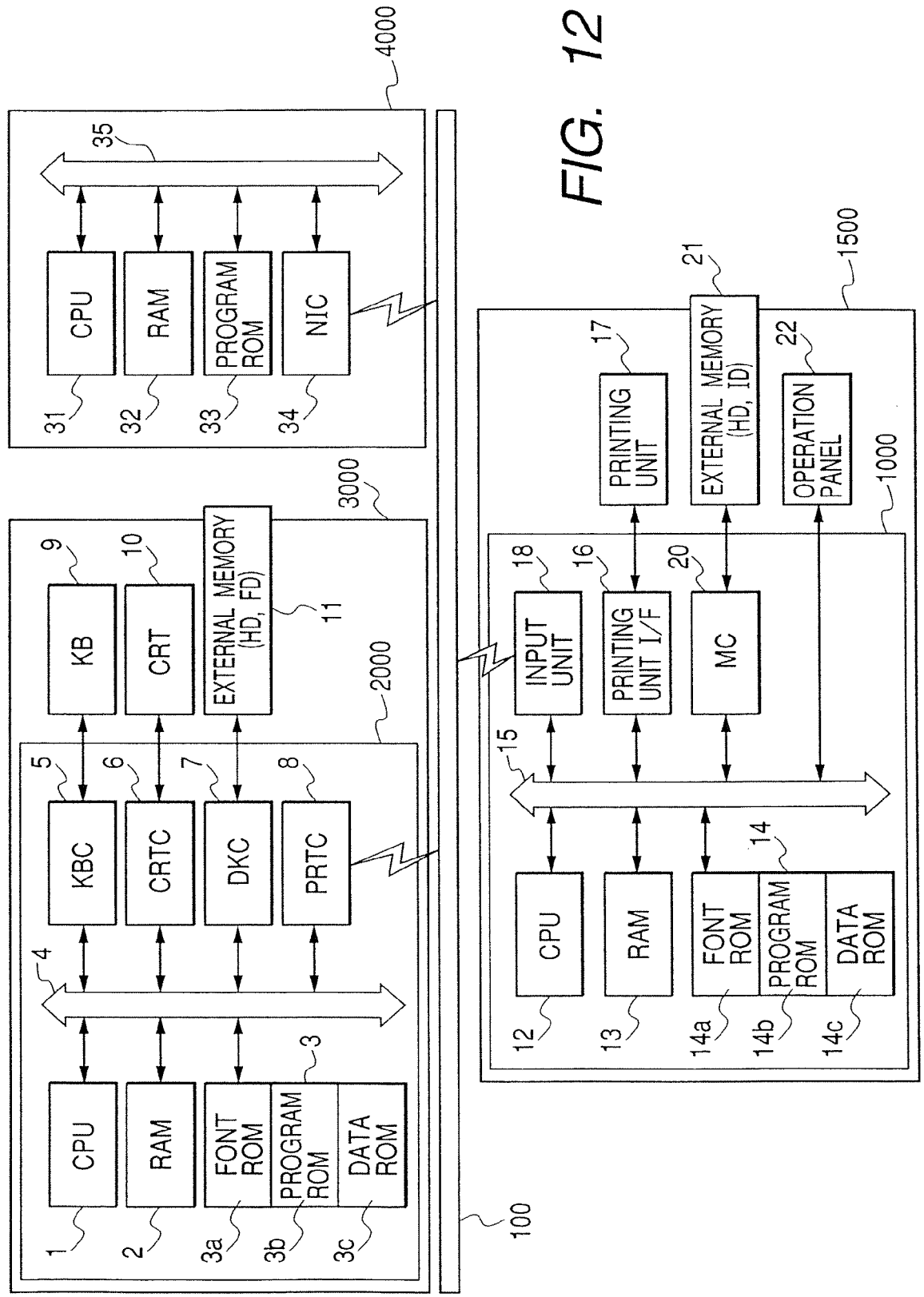
FIG. 12 is a block diagram of the fourth embodiment of the present invention in reference to an example of the configuration of the print processing system.

FIG. 12 is a block diagram of the fourth embodiment of the present invention in reference to an example of the configuration of the print processing system.

Unless otherwise specified, the host computer 3000 is connected to the printer 1500 through any LAN, WAN, public circuit, Internet, etc.

In FIG. 12, the printer management server 4000 comprises a CPU 31 for executing a control program stored in ROM 33 or an external memory not shown in the attached drawings, and RAM 32 functioning as the main memory, a work area, etc. of the CPU 31, and the CPU 31 centrally controls each of the units 32 and 33 connected to a system bus 35.

A network interface cart (NIC) 34 performs a bidirectional communications process with the printer driver and the printer 1500.

Figure 13A:
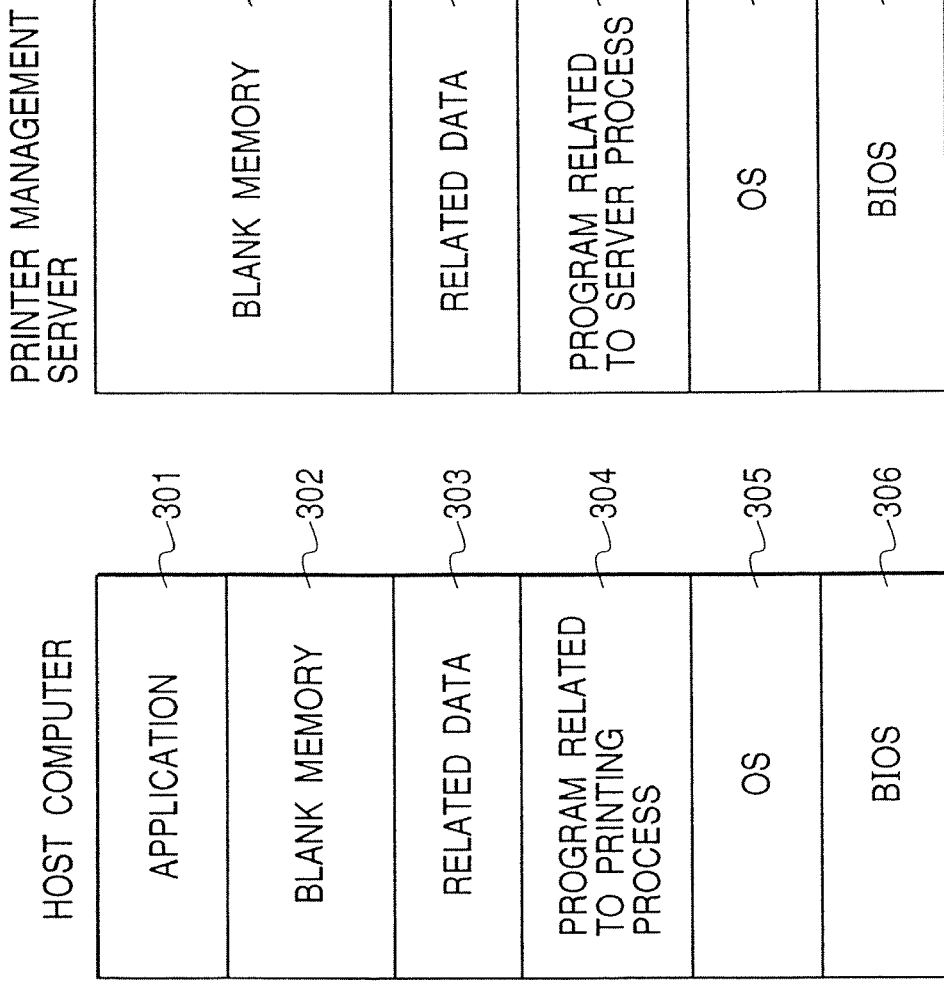

FIG. 13A is a memory map showing the control program which is stored in the program ROM 3b of the host computer 3000 according to the embodiment of the present invention, and becomes executable after it is loaded to the RAM 2 of the host computer 3000.

The encryption, a data feature amount computation function, etc. for use in the host computer 3000 according to the embodiment of the present invention are resident as a part of a program 304 related to a printing process.

A public key of the printer management server 4000 and a private key of a printer driver itself are resident as a part of a related data 303.

FIG. 13B is a memory map showing the control program which is stored in the program ROM 33 of the printer management server 4000 according to the embodiment of the present invention (or an external memory not shown in the attached drawings), and becomes executable after it is loaded to the RAM 32 of the printer management server 4000.

The encryption/decryption, a data feature amount computation function, a printer retrieval process, etc. for use in the printer management server 4000 according to the embodiment of the present invention are resident as a part of the program 313 related to a printing process.

The printer information (a setting position and an address of each printer, a public key of each printer, etc.) managed by the printer management server 4000 is resident as a part of the related data 312.

FIG. 13C is a memory map showing the control program which is stored in the program ROM 14b of the printer 1500 according to the embodiment of the present invention, and becomes executable after it is loaded to the RAM 13 of the printer 1500.

The decryption, a data feature amount computation function, etc. for use in the printer 1500 according to the embodiment of the present invention are resident as a part of a program 323 related to a printing process. A public key of the printer management server 4000 and a private key of a printer driver itself are resident as a part of a related data 322.

Figure 14:
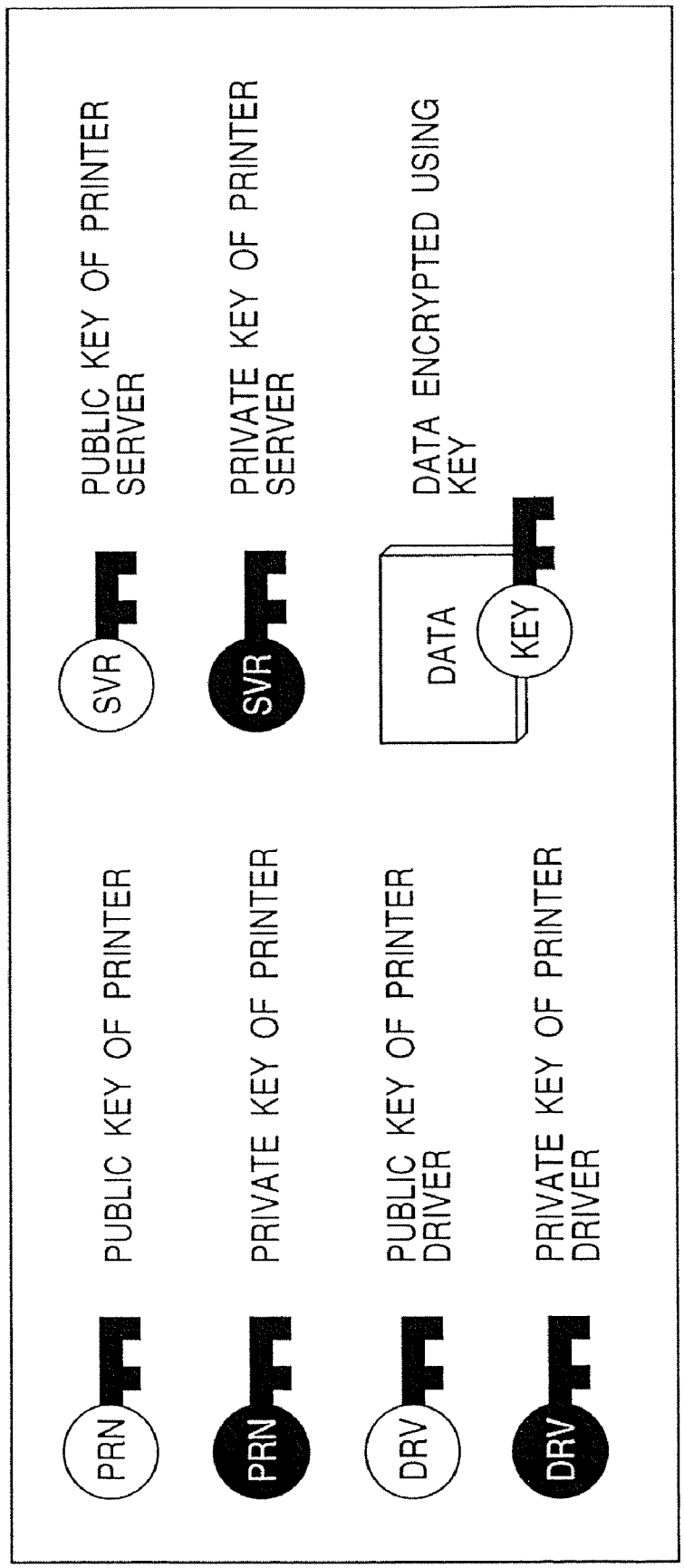
FIG. 14 shows the fourth embodiment of the present invention by explaining an encryption key used in the print processing system.
Figure 15:
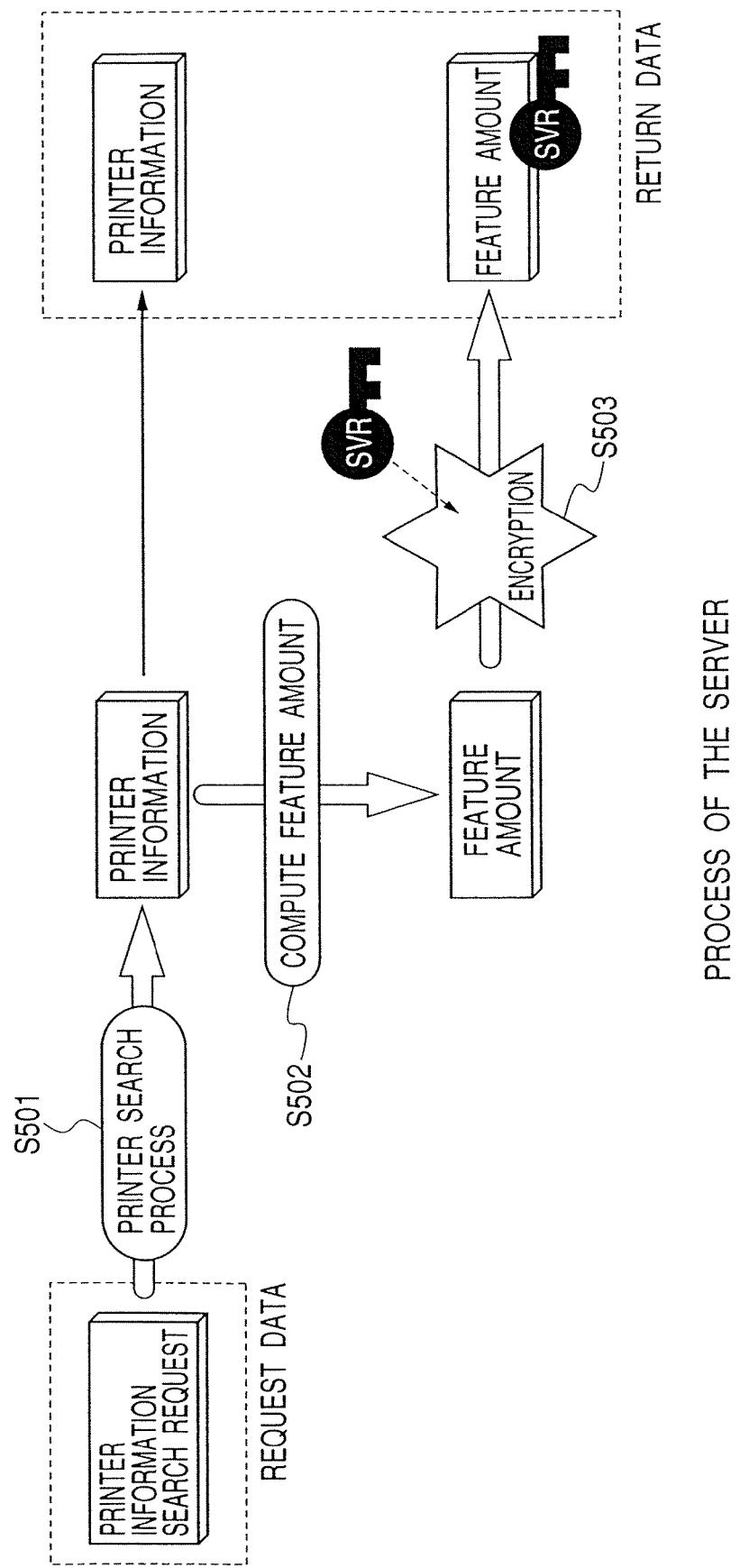
FIG. 15 shows the fourth embodiment of the present invention in reference to a flowchart of the process of the printer management server.

FIG. 14 shows the key for use in the print processing system (refer to the flowcharts shown in and after FIG. 15)

according to the embodiment of the present invention. In the embodiment, the encryption is realized by the public key cryptosystem, and each information equipment has its own public key and private key. Therefore, the respective keys are individually represented.

In FIG. 14, the picture showing the key overriding the data indicates that the data is encrypted by the corresponding key.

In the print processing system according to the embodiment of the present invention, the printer driver obtains the information about the printer 1500 from the printer management server 4000 in a safe method, and the printing data encrypted in the public key cryptosystem is transmitted to the printer 1500.

The public key cryptosystem is a method in which the encryption and the decryption are realized using different keys (private key and public key) between a user and the user's communication partner, and data encrypted using one key cannot be decrypted without using the other key.

In the public key cryptosystem, the public key is normally published, and the private key is kept in secret. In the public key cryptosystem, it is not necessary to prepare a specific key for each communication partner, and a public key can be published. Therefore, a key can be easily transmitted to a communication partner with a person who can decrypt the key limited to the user.

If the public key cryptosystem is applied to, for example, the printer 1500 according to the present embodiment, and the printing data is encrypted using the published public key of the printer, then the data can be printed only on the destination printer with the printing data transmitted from any printer driver, thereby disabling the other printers to print the data.

A digital signature is used as a method of a printer driver safely obtaining printer information from the printer management server 4000.

A digital signature is obtained by encrypting a computation result of the feature amount of the contents of the data to be transmitted using a source private key. In this example, the printer information is encrypted using the private key of the printer management server 4000.

The printer driver holds the public key of the printer management server 4000, decrypts the digital signature using the public key, and compares the decrypted digital signature with the feature amount computed from the separately transmitted printer information, thereby successfully confirming the identification of the source and the presence/absence of the falsification of the printing data (printing job).

The feature amount can be represented by a hash value, a checksum, etc. A hash value is computed using a hash function which is hardly obtained from a computation result or is hardly falsified to obtain the same hash value.

When a user performs a printing operation in an application, the application passes the printing data to the printer driver, and performs a printing process. The printer driver determines the first printer for outputting data, and transmits printer information search request data to the printer management server 4000 to obtain the address and the key of the printer.

The selection reference of the printer in the printer management server 4000 which receives the printer information search request data may be requested to:

"print an estimate, etc. on the printer at hand (of, for example, the closest convenience store) when a user is out";

"print data on the printer closest to the user when the user stays away from home or office";

"confidentially print data on the printer of a client, etc."

To determine a printer on which data is to be printed, the user performs a printer selecting operation in advance or interactively.

The process of the printer management server 4000 retrieving printer information and returning the information to the printer driver is described below in detail.

The printer management server 4000 selects an appropriate printer from the list of the printer information managed by the server depending on the contents (necessary capabilities of a printer such as the position, color/both sides/staple, etc. of the printer) of the printer information search request data received from the printer driver, and retrieves the printer information about the corresponding printer (step S501).

It is assumed that the above-mentioned printer information includes a printer address, the public key, etc. of a printer.

When a printer communicates data with a host using a SOAP (simple object access protocol) implemented on the HTTP (hyper text transfer protocol), it is effective to encrypt a URL.

FIG. 23 shows an embodiment of the present invention in reference to the encrypting process on the information about a destination. In (1) in FIG. 23, upon recognition of a print instruction from a user, a host computer 2301 uses the SOAP implemented on the HTTP and requests a printer 2305 to transmit as printer information the destination (a URL in this case) of the data of the printer together with the device ID and the function of the device. In (2) and (3) in FIG. 23, the printer transmits the printer information including URL 2305 to the host computer 2301 which has transmitted the request to obtain the printer information. At this time, the URL is encrypted using a public key 2302 of the host. Simultaneously or immediately after the encryption, a post method of the HTTP from an external unit to the URL of the transmitter is awaited. In (4), the host computer 2301 decrypts the URL using a its own private key 2303. Using the post method of the HTTP, the host computer 2301 inputs the data to be printed into the decrypted URL indicating a predetermined storage area in the printer. The post method is prescribed in the HTTP, and is a procedure remotely called for input of data to a predetermined storage area. Refer to, for example, RFC 2616 which is a document issued from the IETF (Internet Engineering Task Force).

At this time, it is not safe if the URL is transmitted as raw data because the printer awaits an external post method in the above-mentioned step (2), and is externally vulnerable. That is, if the URL is transmitted as raw data, it is subject to an attack from an evil cracker. When the evil cracker is informed of the URL, he or she can take cracking action such as a write to a storage area of the URL in the printer using the obtained URL, or attempt illegal access. Then, it is desired that a URL is transmitted after being encrypted in the printer using a public key obtained from the host computer. The host computer decrypts the URL in the host computer obtained from the printer using its own private key, and transmits the printing data using the URL in the post method of the HTTP.

It is obvious that the URL is an example of a URI (unified resource identifier). Described above is an URL as a preferable example, but it is also effective in enhancing the security of the identification information indicating a destination printer such as an IP address, the address of the identifier of the SMB prescribed by NETBEUI, that is, the information about the destination and the information about the destination of image forming data, etc.

In the printer search step in step S501, it is not always necessary to select one printer. That is, in the printer search step in step S501, an interactive process can be performed such that the printer management server 4000 can roughly select some printers depending on the conditions (contents of search request data of the printer information), once return the printer information about the roughly selected printers to the printer driver, and allow the printer driver to finally select a desired printer from among the roughly selected printers.

Furthermore, the printer management server 4000 can transmit the printer information about all printers managed by itself without roughly selecting the printers, and allow the printer driver to select a desired printer.

Then, the printer management server 4000 computes the feature amount using the feature amount computation function from the retrieved printer information (step S502), and encrypts the feature amount using the private key of the printer management server 4000 (step S503). The result obtained in step S503 is a digital signature. Finally, the printer information and the digital signature are returned to the printer driver.

The process of a printer driver transmitting an encrypted printing job to a printer is described below in detail by referring to the process flow shown in FIG. 16.

Using the public key of the printer management server 4000, the printer driver decrypts a digital signature contained in the digital signature and the printer information returned from the printer management server 4000, and obtains the feature amount (step S601). The printer driver is assumed to hold the public key of the printer management server 4000.

Next, the printer driver computes the feature amount from the obtained printer information using the feature amount computation function (step S602), compares it with the received feature amount (step S603), and confirms that the printer information has been transmitted from the desired printer management server 4000 and the printing data has not been falsified if the feature amounts match each other as a result of the comparison.

Then, the printer driver retrieves a public key contained in the printer information (step S604), and encrypts the printing data transmitted from the application using the retrieved public key (step S605). Finally, the encrypted printing data is transmitted as a printing job to the printer 1500.

The process of the printer obtaining printing data from a printing job is described below in detail by referring to the process flow shown in FIG. 17.

The printer 1500 decrypts the printing data in the received printing job using the private key of the printer 1500 (step S701), and obtains the printing data.

Figure 16:
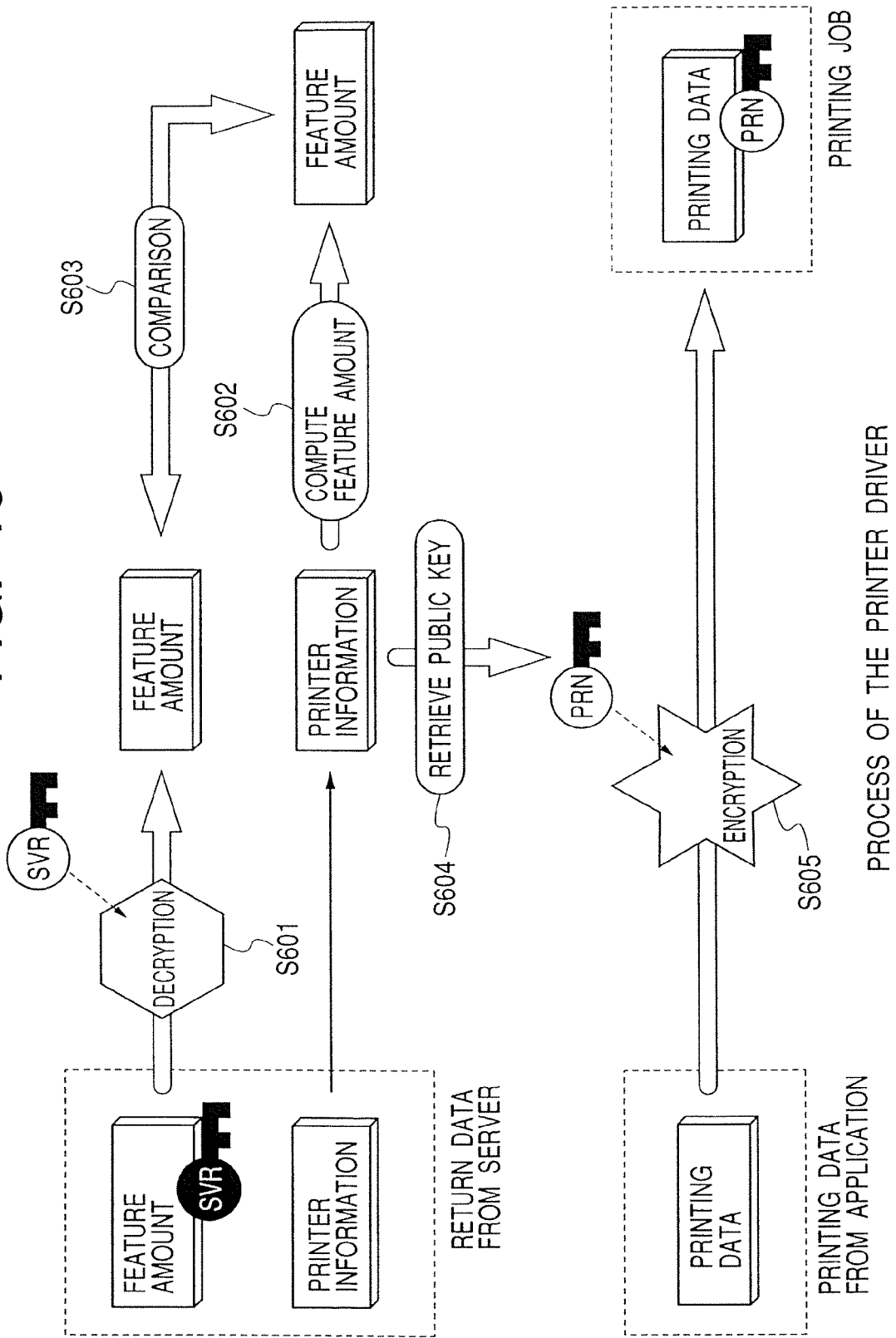
FIG. 16 shows the fourth embodiment of the present invention in reference to a flowchart of the process of the printer driver.
Figure 17:
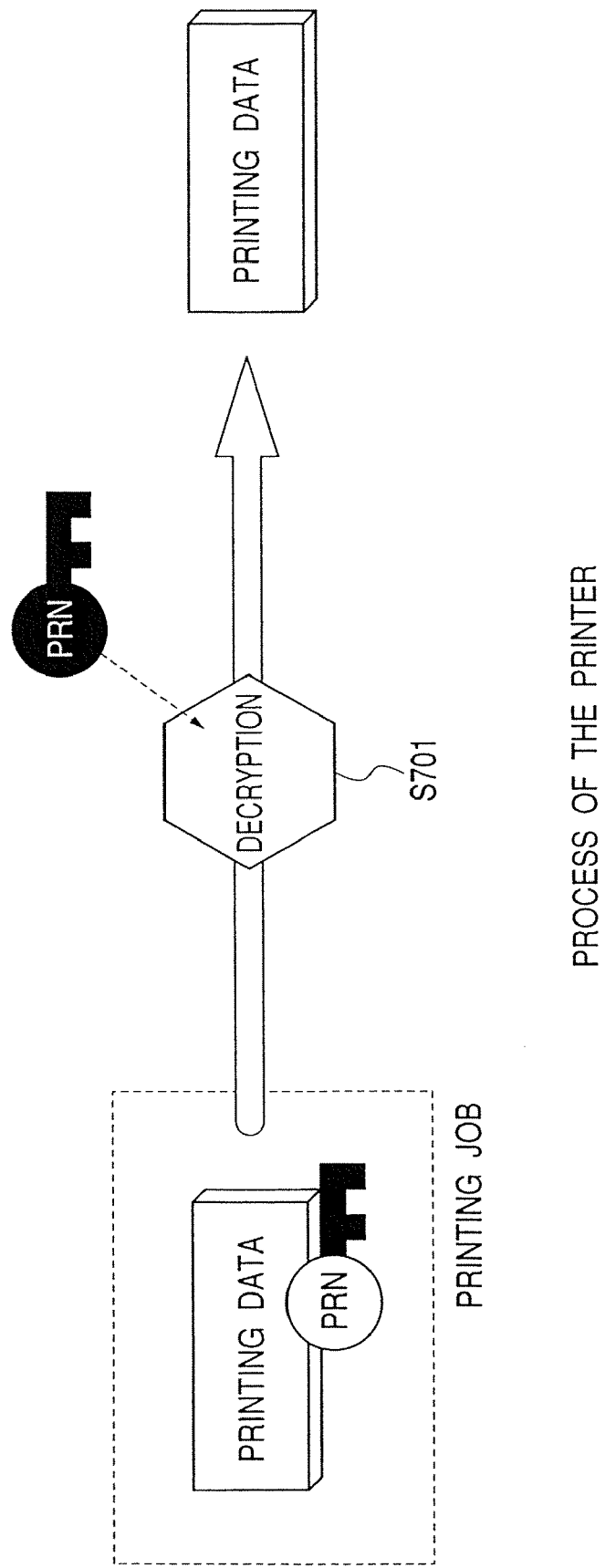
FIG. 17 shows the fourth embodiment of the present invention in reference to a flowchart of the process of the printer.
Figure 18:
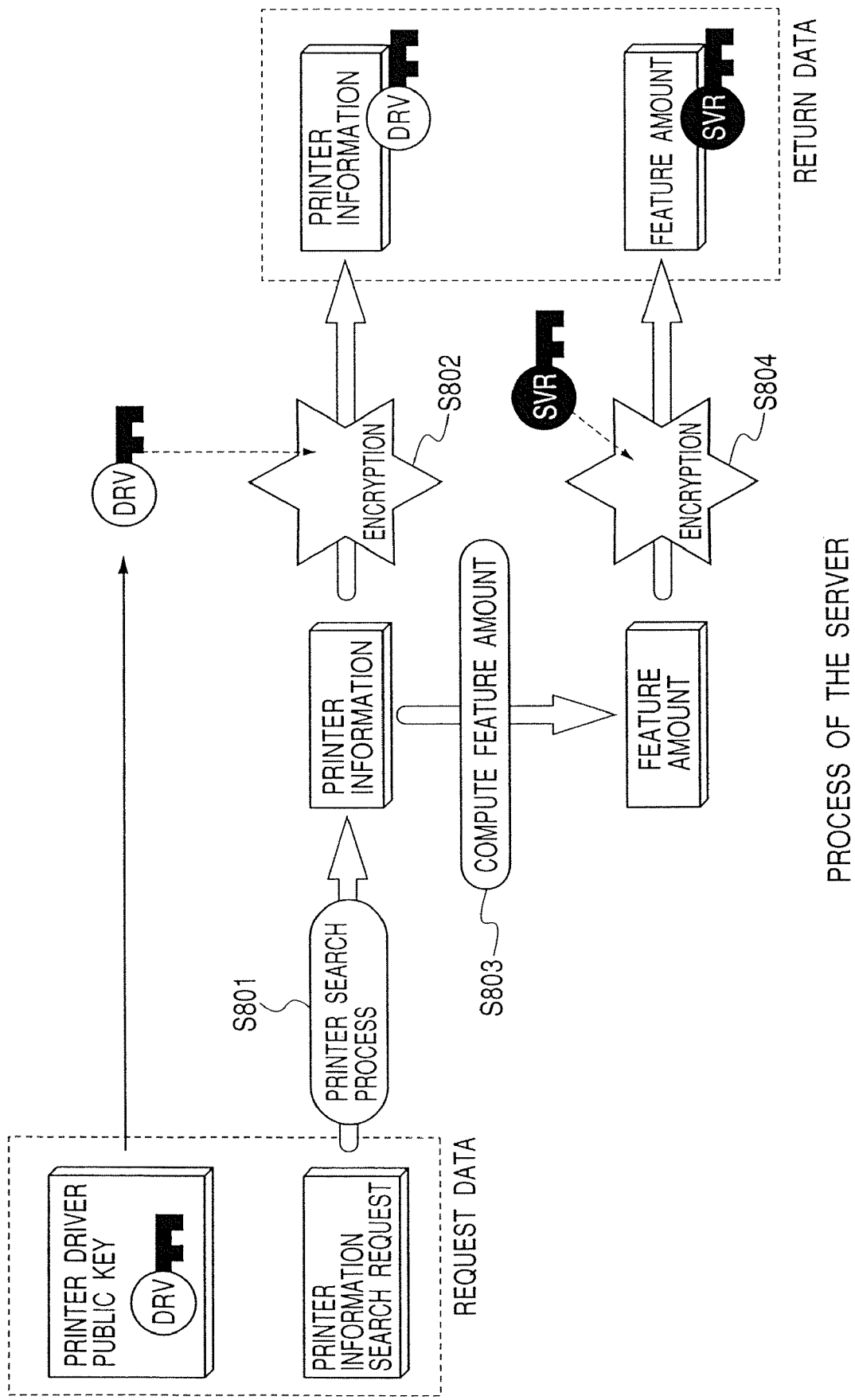
FIG. 18 shows the fifth embodiment of the present invention in reference to a flowchart of the process of the printer management server.

In each step shown in FIGS. 16 and 17, a printing job can be transmitted from the printer driver to the printer 1500 which protecting the printing job against illegal printing by other printers than a specified printer.

The printer driver only has to be informed of the secret key of the printer management server 4000 to obtain the printer information in a safe method without individually managing the address, capability or secret key of a target printer. That is, only the printer management server 4000 has to be appropriately maintained to easily and safely print printing data from any host computer.

Fifth Embodiment

The fifth embodiments of the print control apparatus, the printer, the printer management server, the print processing system, the print control method, the computer program, and the computer-readable recording medium according to the present invention are described below. The configuration of the hardware of the print processing system according to the present embodiment is similar to the configurations of the above-mentioned fourth embodiments. Therefore, the same components as those in the fourth embodiments are assigned the same reference numerals shown in FIGS. 11 to 15, and the detailed explanation is omitted here.

In the above-mentioned fourth embodiment, since a digital signature is added to the information communicated at a printer information obtaining request of a printer driver, there is no possibility that data is falsified, but can be referred to by anybody over a network. Therefore, the subsequent action can be tracked by the third party.

Therefore, the present embodiment shows an example of encrypting data returned by the printer management server 4000 to enhance the security of the information.

The difference from the fourth embodiment is the communications between a printer management server and a printer driver, and the process of printing encrypted printing data on the printer side is the same as the process shown in FIG. 17.

If a user performs a printing operation on an application, the printing data is passed by the application to the printer driver for the printing process. The printer driver transmits printer information search request data to the printer management server 4000. At this time, according to the present embodiment, the public key of the printer driver is also transmitted to reduce the information for server management. It is not required to transmit when the server manages the public key of the printer driver to be managed.

The process of the printer management server 4000 retrieving printer information and returning it to the printer driver is describe below in detail by referring to the process flow shown in FIG. 8.

The printer management server 4000 retrieves an appropriate printer from the printer information list managed by the server depending on the contents of the above-mentioned printer information search request data received from the printer driver (step S 801). The process of this step is the same as the process in step S501 described above in reference to the fourth embodiment.

Then, the printer management server 4000 encrypts the retrieved printer information using the received public key of the printer driver (step S802).

Then, the printer management server 4000 computes the feature amount using a feature amount computation function from the original printer information (step S803), and encrypts the feature amount using the private key of the printer management server 4000 (step S804).

The result obtained in step S804 is a digital signature. Finally, the encrypted printer information and the digital signature are returned to the printer driver.

Figure 19:
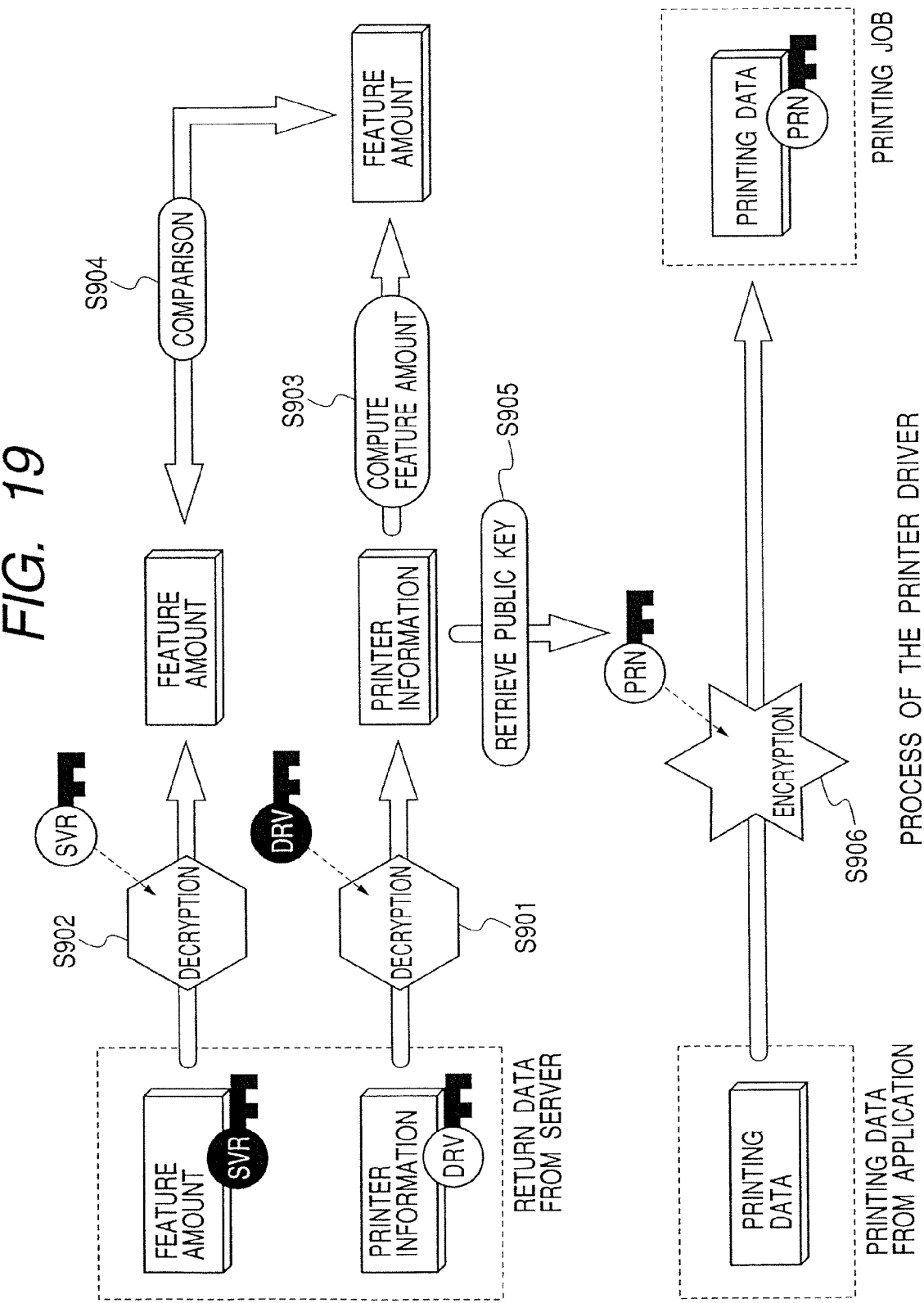
FIG. 19 shows the fifth embodiment of the present invention in reference to a flowchart of the process of the printer driver.

The process of the printer driver transmitting the encrypted printing job to the printer is described below in detail by referring to the process flow shown in FIG. 19.

The printer driver decrypts the printer information received from the printer management server 4000 using the private key of the printer driver (step S901), and obtains the printer information.

The printer driver decrypts the digital signature received from the printer management server 4000 using the public key of the printer management server 4000, and obtains the feature amount of the printer information (S902). The printer driver is assumed to hold the public key of the printer management server 4000.

Then, the printer driver computes the feature amount using the feature amount computation function from the obtained printer information (step S903), compares it with the received feature amount (step S904), and confirms that the obtained printer information has been transmitted from the desired printer management server 4000 and the printing data has not been falsified if the feature amounts match each other as a result of the comparison.

Then, the printer driver retrieves a public key contained in the printer information (step S905), and encrypts the printing data received from the application using the retrieved public key (step S906). Finally, the encrypted printing data is transmitted as a printing job to the printer 1500.

In the above-mentioned steps, the printer information returned from the printer management server 4000 can be accessed only by the printer driver which has issued the request to the printer management server 4000, thereby successfully enhancing the security.

Since the printer driver transmits its own public key, it is not necessary for the printer management server 4000 to manage the corresponding printer driver. Since the public key is published, there is no problem of passing it to the printer management server 4000.

In this example of the present embodiment, printer information is encrypted. However, means for transmitting the public key of the printer driver from the printer driver to the printer management server 4000, and returning the information encrypted using the public key to the printer driver can also be applied to other data.

Therefore, when other data than the printer information is encrypted, the system of the printer management server 4000 which is free of management of the printer driver can be provided.

In the above-mentioned example of the present embodiment, the secret key of the printer driver is used. However, an available secret key is not limited to the secret key of a printer driver, but the key of the host computer 3000 can be used, or the key of the current user can be used obviously.

For example, when the secret key of the host computer 3000 is used, the host computer 3000 can be used in a multi-user mode so that anybody on the host computer 3000 can print printing data on the printer 1500 on the same condition.

Furthermore, when the secret key of a user is used, the user can print printing data on the same condition from an in-house desktop personal computer (PC) or any notebook personal computer (PC) out in the field.

Sixth Embodiment

The sixth embodiments of the print control apparatus, the printer, the printer management server, the print processing system, the print control method, the computer program, and the computer-readable recording medium according to the present invention are described below. The configuration of the hardware of the print processing system according to the present embodiment is similar to the configurations of the above-mentioned fourth and fifth embodiments. Therefore, the same components as those in the fourth embodiments are assigned the same reference numerals shown in FIGS. 11 to 19, and the detailed explanation is omitted here.

In the fourth and fifth embodiments of the present invention, printing data cannot be printed on the printers other than a specified printer.

However, if anybody hooks the original printing data and transmits different data to a target printer by following the same steps as the fourth and fifth embodiments, the printer cannot determine whether or not the received printing data has been falsified.

This problem can be solved by assigning a digital signature to printing data. However, to solve the problem, the public key of the target printer driver is to be recorded in the printer.

Furthermore, the public key is to be recorded in all printers in the print processing system. If a target host computer is added, all printers have to be maintained correspondingly. Therefore, determining in this method whether or not printer driver has been falsified requires a laborious operation.

Here, according to the present embodiment, printing data is transmitted through the printer management server 4000 so that the printing data can be protected against falsification and the maintenance of the printer 1500 can be almost eliminated.

Figure 20:
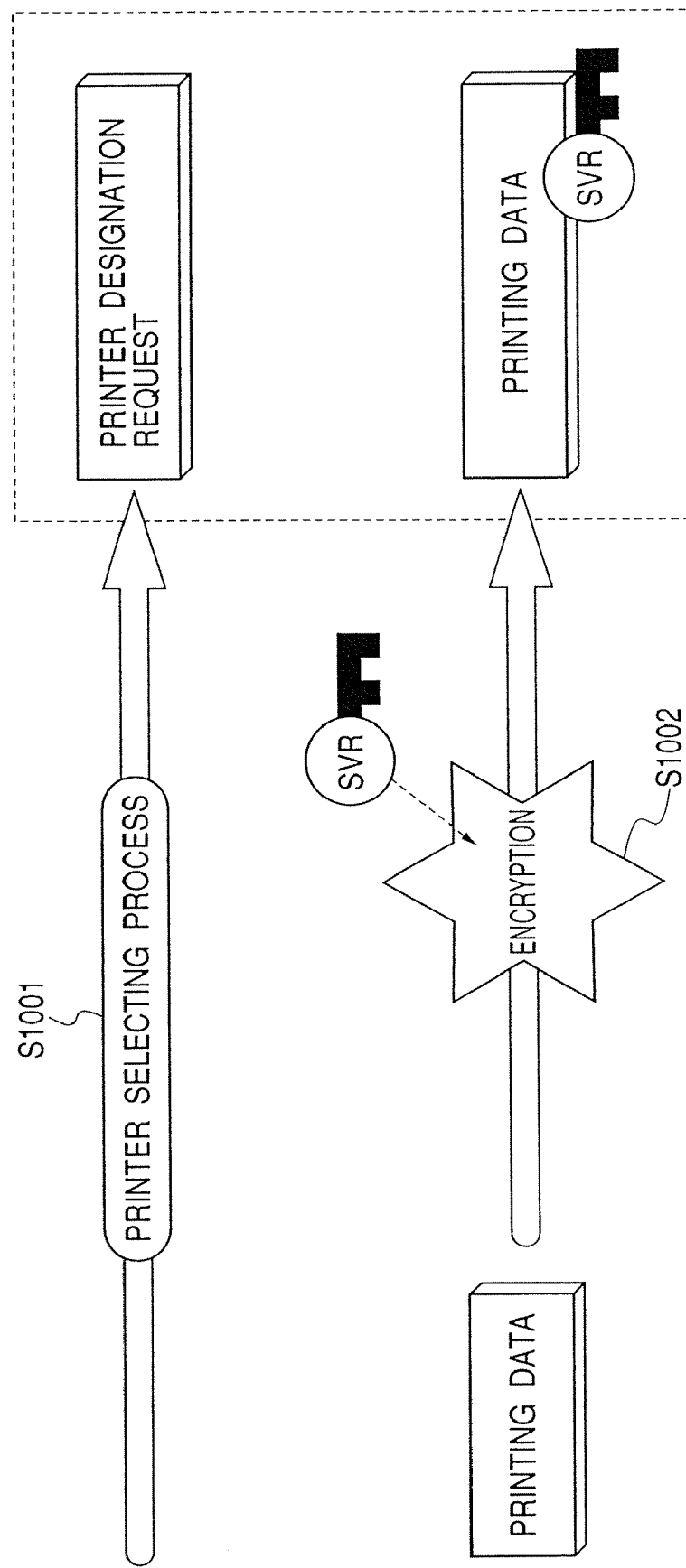
FIG. 20 shows the sixth embodiment of the present invention in reference to a flowchart of the process of the printer driver.

The process of the printer driver transmitting printing data to the printer management server is described below in detail by referring to the process flow shown in FIG. 20.

When a user performs a printing operation on an application, the application passes printing data to the printer driver, thereby performing a printing process.

To first determine the destination printer, the printer driver generates request data to the printer management server 4000, or designates a printer through interactive communications with the printer management server 4000 (S1001), and generates a request to specify a printer to be transmitted to the printer management server 4000.

Then, the printer driver encrypts the printing data received from the application using the public key of the printer management server 4000 (step S1002). Finally, it transmits the encrypted printing data and the printer designation request to the printer management server 4000.

Figure 21:
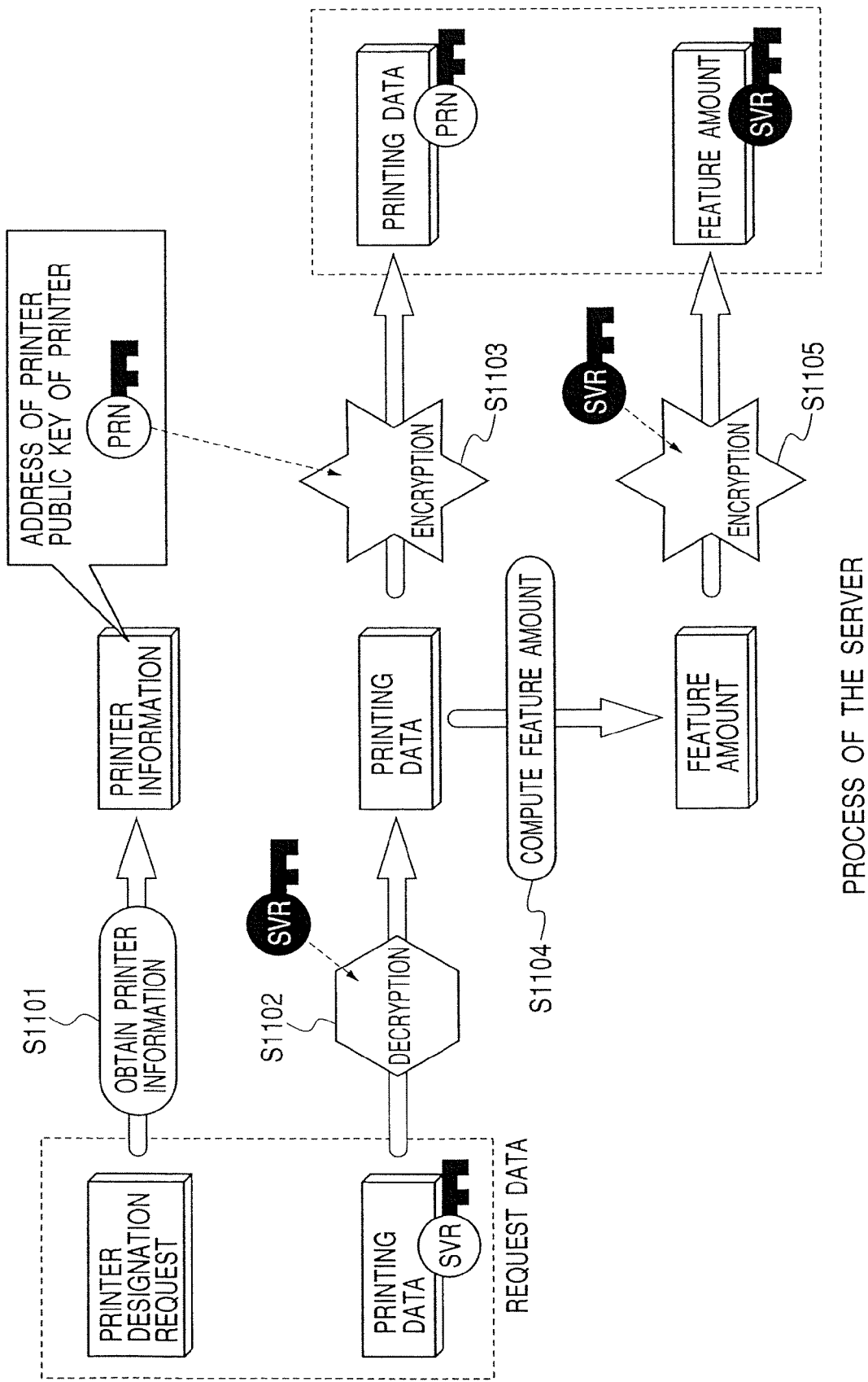
FIG. 21 shows the sixth embodiment of the present invention in reference to a flowchart of the process of the printer management server.

The process of the printer management server 4000 transmitting the encrypted printer driver to the printer 1500 is described below in detail by referring to the process flow shown in FIG. 21.

In response to the printer designation request received from the printer driver, the printer management server 4000 selects an appropriate printer from the printer information list managed by the server, and retrieves the corresponding printer information (step S1101). Assume that the printer information contains the address, the public key, etc. of the printer.

Next, the printer management server 4000 decrypts the printing data received from the printer driver using the private key of the printer management server 4000 (step S1102), and obtains the printing data. After this step, the information equipment other than the printer management server 4000 cannot tap the printing data.

Then, the printer management server 4000 encrypts the obtained printing data using the public key of the printer contained in the printer information (step S1103).

The printer management server 4000 then computes the feature amount computation function from the obtained printing data (step S1104), and encrypts the computed feature amount using the private key of the printer management server 4000 (step S1105). The obtained result is a digital signature.

Finally, the printer management server 4000 transfers a combination of the encrypted printing data and the digital signature as a printing job to the printer address contained in the printer information.

Figure 22:
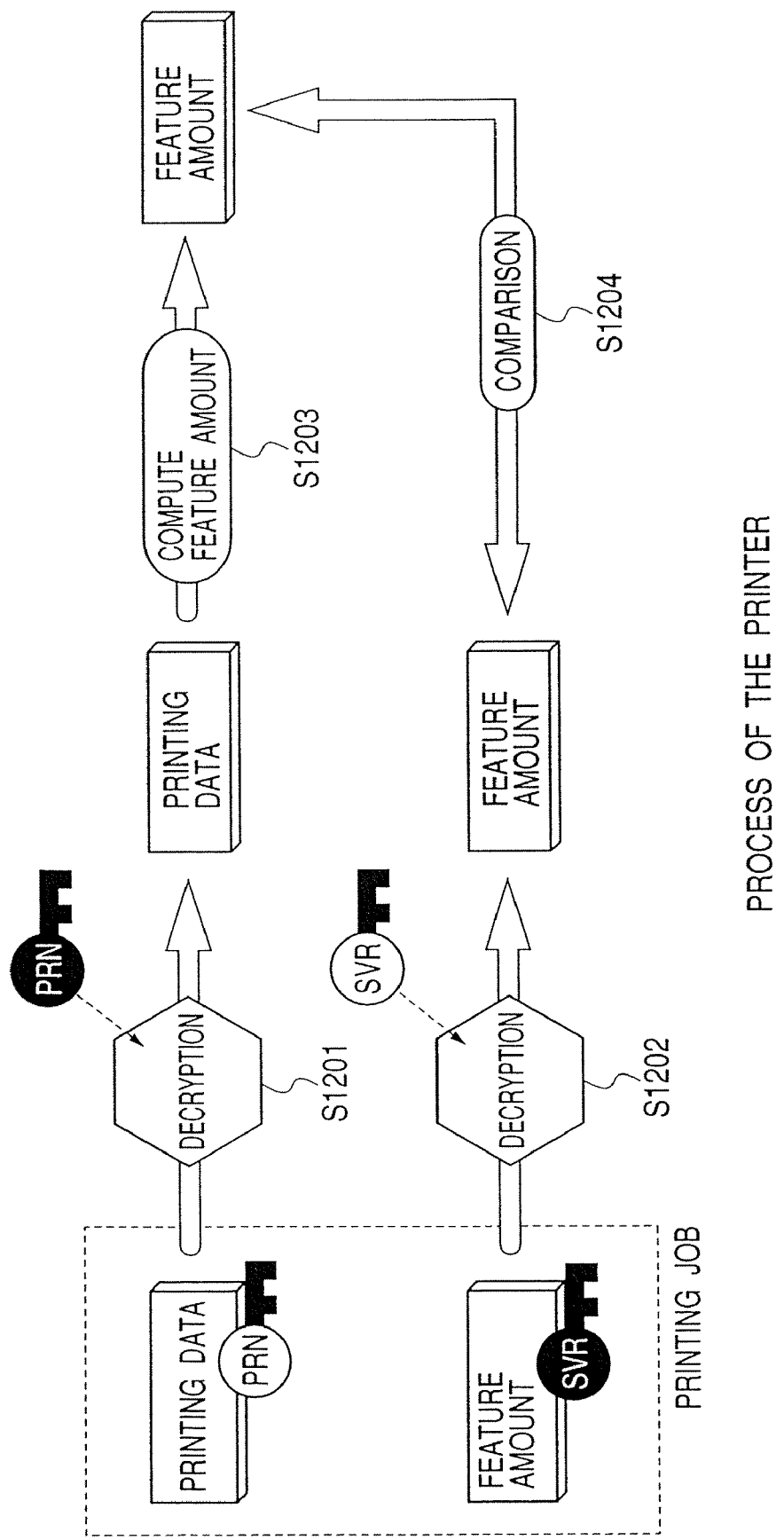
FIG. 22 shows the sixth embodiment of the present invention in reference to a flowchart of the process of the printer.

The process of the printer 1500 obtaining the printing data from the received printing job is described below in detail by referring to the process flow shown in FIG. 22.

The printer 1500 decrypts the printing data in the received printing job using the private key of the printer 1500 (step S1201), and obtains the printing data. After this step, information equipment other than a specified printer cannot tap the printing data.

Then, the printer 1500 decrypts the digital signature in the received printing job using the public key of the printer management server 4000 of the source (step S1202), and obtains the feature amount of the printing data.

The printer 1500 then computes the feature amount using the feature amount computation function from the obtained printing data (step S1203), compares the result with the received feature amount (step S1204), and confirms that the printing data obtained in step S1201 has not been falsified if the feature amounts match each other.

Thus, according to the present embodiment, the printing data can be not only protected against tapping, but also protected against the falsification.

Furthermore, the public key of other information equipment to be held by each information equipment is only the public key of the printer management server 4000 for the printer driver and the printer. The printer management server 4000 has to manage only the public key of the printer managed by the server. Therefore, although the configuration of the print processing system is changed, only the printer management server 4000 is to be maintained.

Other Embodiments of the Present Invention

The present invention also includes the embodiment of providing a program code of the software for realizing the function of the above-mentioned embodiments for the apparatuses connected to various devices or the computers in the system so that various devices can be operated to realize the functions of the above-mentioned embodiments, and operating various devices according to the program stored in the computer (CPU or MPU) of the system or the apparatus.

In this case, the program code of the above-mentioned software realizes the functions of the above-mentioned embodiments, and the program code itself, and the means for providing the program code for the computer, for example, the storage medium storing the program code configure the present invention. The recording medium storing such a program code can be, for example, a flexible disk, a hard disk, an optical disk, a magneto-optic disk, CD-ROM, a magnetic tape, a non-volatile memory card, ROM, etc.

The embodiments of the present invention also include a program code not only when the functions of the above-mentioned embodiments are realized by the computer executing the provided program code, but also when the functions of the above-mentioned embodiments are realized in cooperation with the OS (operating system) operated in the computer or another application software, etc.

Furthermore, after the provided program code is stored in the memory of the function expanding board of a computer or the function expanding unit connected to the computer, a part or all of the actual process can be performed by the CPU provided in the function expanding board and the function expanding unit at an instruction of the program code, and the functions of the above-mentioned embodiments are realized by the process. It is obvious that this process can also be included in the present invention.

As described above, according to the present invention, a printing job containing printing data is transmitted to a specified printer through a communications medium, and the specified printer is controlled to print the printing data. At this time, the printing data is encrypted in the encrypting method in which only the printer designated to print the printing job can perform decryption. Therefore, although the printing job containing printing data is tapped, the printing data can be protected against illegal printing by any other printers and the tapped printing data can be protected against illegal use by the third party.

Furthermore, according to another feature of the present embodiment, the feature amount computed from the printing data can be encrypted to generate a digital signature, and the generated digital signature can be contained in the printing job and transmitted. Therefore, the source of the printing job can be designated and no falsification on the printing job can be guaranteed. As a result, although the printing data is printed through the communications medium, tapping or falsification of the printing data, if occurs, can be detected. Thus, erroneous printing can be prevented, and important printing data can be safely printed.

According to another feature of the present embodiment, the printers connected to a communications medium can be collectively managed by a printer management server. Therefore, the print control apparatus and a printer have only to hold the public key of the printer management server, and the printer management server only has to hold the public key of the printer managed by the server, thereby considerably reducing the laborious operations required for maintenance in a large system including a plurality of print control apparatuses and a plurality of printers.

The invention claimed is:

1. A print system comprising a print control apparatus for generating a print job, a plurality of image forming apparatuses for printing data based on the print job and a management server for managing information of the plurality of image forming apparatuses, which are connected to each other via a network, the print system comprising:

at least one processor functioning as:

a search request transmission unit, provided in the print control apparatus, configured to transmit to the management server a search request to search the plurality of image forming apparatuses for one image forming apparatus to print data based on a print job, the search request including a necessary condition for the image forming apparatus;

a selection unit, provided in the management server, configured to select the image forming apparatus from among the plurality of image forming apparatuses based on the search request transmitted by the search request transmission unit;

an informing unit, provided in the management server, configured to inform the print control apparatus of an encryption key which can be decrypted only by the image forming apparatus selected by the selection unit and of an address of the selected image forming apparatus;

an image forming apparatus information obtaining unit, provided in the print control apparatus, configured to obtain the encryption key and the address informed by the informing unit;

a first encryption unit, provided in the print control apparatus, configured to encrypt print data using the encryption key obtained by the image forming apparatus information obtaining unit;

a management server information obtaining unit, provided in the print control apparatus, configured to obtain an encryption key which can be decrypted only by the management server;

a second encryption unit, provided in the print control apparatus, configured to encrypt the print data using the encryption key obtained by the management server information obtaining unit;

a print job transmission unit, provided in the print control apparatus, configured to transmit the print job including the print data encrypted by the first encryption unit to the address obtained by the image forming apparatus information obtaining unit, and transmit the print job including the print data encrypted by the second encryption unit to the management server;

a decryption unit, provided in the management server, configured to decrypt the encrypted print data included in the print job transmitted by the print job transmission unit;

a third encryption unit, provided in the management server, configured to encrypt the print data decrypted by the decryption unit using the encryption key of the image forming apparatus selected by the selection unit; and a print data transmission unit, provided in the management server, configured to transmit the print data encrypted by the third encryption unit to the image forming apparatus selected by the selection unit.

2. A print system according to claim 1, wherein the print control apparatus further comprises:

a feature amount computation unit configured to compute a feature amount from the print data;

a digital signature generation unit configured to generate a digital signature by encrypting the feature amount computed by the feature amount computation unit using a private key of the print control apparatus; and a key encryption unit configured to encrypt the private key of the print control apparatus using the encryption key obtained by the image forming apparatus information obtaining unit, wherein the print job transmission unit transmits the print job including the digital signature generated by the digital signature generation unit and the private key of the print control apparatus encrypted by the key encryption unit, and wherein the image forming apparatus comprises:

a key decryption unit configured to decrypt the encrypted private key of the print control apparatus included in the print job using a private key of the image forming apparatus; and a feature amount obtaining unit configured to obtain a feature amount of the print data by decrypting the digital signature included in the print job using said key of the print control apparatus.

3. A print system according to claim 1, wherein the address of the image forming apparatus comprises a port or a uniform resource identifier (URI) for printing.

4. A print system according to claim 1, wherein the selection unit selects candidates of the image forming apparatus based on the search request transmitted by the search request transmission unit, wherein the management server further comprises a second informing unit configured to inform the print control apparatus of information on the candidates of the image forming apparatus selected by the selection unit, and wherein the print control apparatus further comprises a third informing unit configured to inform the management server of the information on one of the candidates informed by the second informing unit, and the informing unit informs the print control apparatus of the encryption key which can be decrypted only by the image forming apparatus designated by the information informed by the third informing unit and of the address of the designated image forming apparatus.

5. A print system according to claim 1, wherein the search request includes information designating a location and a performance of the image forming apparatus.

6. A print method for a print system comprising a print control apparatus for generating a print job, a plurality of image forming apparatuses for printing data based on the print job and a management server for managing information of the plurality of image forming apparatuses, which are connected to each other via a network, the print method comprising:

a search request transmission step, used by the print control apparatus, of transmitting to the management server a search request to search the plurality of image forming apparatuses for one image forming apparatus to print data based on a print job, the search request including a necessary condition for the image forming apparatus;

a selection step, used by the management server, of selecting the image forming apparatus from among the plurality of image forming apparatuses based on the search request transmitted in the search request transmission step;

an informing step, used by the management server, of informing the print control apparatus of an encryption key which can be decrypted only by the image forming apparatus selected in the selection step and of an address of the selected image forming apparatus;

an image forming apparatus information obtaining step, used by the print control apparatus, of obtaining the encryption key and the address informed by the informing step;

a first encryption step, used by the print control apparatus, of encrypting print data using the encryption key obtained in the image forming apparatus information obtaining step;

a management server information obtaining step, used by the print control apparatus, of obtaining an encryption key which can be decrypted only by the management server;

a second encryption step, used by the print control apparatus, of encrypting the print data using the encryption key obtained in the management server information obtaining step;

a print job transmission step, used by the print control apparatus, of transmitting the print job including the print data encrypted in the first encryption step to the address obtained in the image forming apparatus information obtaining step, and transmitting the print job including the print data encrypted by the second encryption step to the management server;

a decryption step, used by the management server, of decrypting the encrypted print data included in the print job transmitted in the print job transmission step;

a third encryption step, used by the management server, of encrypting the print data decrypted in the decryption step using the encryption key of the image forming apparatus selected in the selection step; and a print data transmission step, used by the management server, configured to transmit the print data encrypted in the third encryption step to the image forming apparatus selected in the selection step.

7. A print method according to claim 6, wherein the steps used by print control apparatus further comprise:

a feature amount computation step, of computing a feature amount from the print data;

a digital signature generation step, of generating a digital signature by encrypting the feature amount computed by the feature amount computation unit using a private key of the print control apparatus; and a key encryption step, of encrypting the private key of the print control apparatus using the encryption key obtained in the image forming apparatus information obtaining step, wherein the print job transmission step includes transmitting the print job including the digital signature generated in the digital signature generation step and the private key of the print control apparatus encrypted in the key encryption step, and wherein the steps used by the image forming apparatus comprise:

a key decryption step, of decrypting the encrypted private key of the print control apparatus included in the print job using a private key of the image forming apparatus; and a feature amount obtaining step, of obtaining a feature amount of the print data by decrypting the digital signature included in the print job using the key of the print control apparatus.

8. A print method according to claim 6, wherein the address of the image forming apparatus comprises a port or a uniform resource identifier (URI) for printing.

9. A print method according to claim 6, wherein the selection step includes selecting candidates of the image forming apparatus based on the search request transmitted in the search request transmission step, wherein the steps used by the management server further comprise a second informing step, of informing the print control apparatus of information on the candidates of the image forming apparatus selected in the selection step, and wherein the steps used by the print control apparatus further comprise a third informing step, of informing the management server of the information on one of the candidates informed in the second informing step, and the informing step includes informing the print control apparatus of the encryption key which can be decrypted only by the image forming apparatus designated by the information informed in the third informing step and of the address of the designated image forming apparatus.

10. A print method according to claim 6, wherein the search request includes information designating a location and a performance of the image forming apparatus.

11. A management server connected via a network to a print control apparatus for generating a print job and to a plurality of image forming apparatuses for printing data based on the print job, the management server managing information of the plurality of image forming apparatuses and comprising:

at least one processor functioning as:

a selection unit configured to select, based on a search request transmitted from the print control apparatus, one image forming apparatus to print data based on a print job from among the plurality of image forming apparatuses;

an informing unit configured to inform the print control apparatus of an encryption key which can be decrypted only by the image forming apparatus selected by the selection unit and of an address of the selected image forming apparatus;

a management server information informing unit configured to inform the print control apparatus of an encryption key which can be decrypted only by the management server;

a decryption unit configured to decrypt print data encrypted by the encryption key of the management server, the encrypted print data being included in a print job transmitted by the print control apparatus;

an encryption unit configured to encrypt the print data decrypted by the decryption unit using the encryption key of the image forming apparatus selected by the selection unit; and a print data transmission unit configured to transmit the print data encrypted by the encryption unit to the image forming apparatus selection by selection unit, wherein the print control apparatus (a) encrypts the print data using the encryption key informed by the informing unit and transmits the print job including the encrypted print data to the address of the selected image forming apparatus informed by the informing unit, and (b) encrypts the print data using the encryption key informed by the management server information informing unit and transmits the print job including the encrypted print data to the management server.

12. A method for a print system comprising a management server connected via a network to a print control apparatus for generating a print job and to a plurality of image forming apparatuses for printing data based on the print job, the management server managing information of the plurality of image forming apparatuses, the method comprising:

a selection step of selecting, based on a search request transmitted from the print control apparatus, one image forming apparatus to print data based on a print job from among the plurality of image forming apparatuses;

an informing step of informing the print control apparatus of an encryption key which can be decrypted only by the image forming apparatus selected in said selection step and of an address of the selected image forming apparatus;

a management server information informing step of informing the print control apparatus of an encryption key which can be decrypted only by the management server;

a decryption step of decrypting print data encrypted by the encryption key of the management server, the encrypted print data being included in a print job transmitted by the print control apparatus;

an encryption step of encrypting the print data decrypted in the decryption step using the encryption key of the image forming apparatus selected in said selection step; and a print data transmission step of transmitting the print data encrypted in said encryption step to the image forming apparatus selection in said selection step, wherein the print control apparatus (a) encrypts the print data using the encryption key informed in said informing step and transmits the print job including the encrypted print data to the address of the selected image forming apparatus informed in said informing step, and (b) encrypts the print data using the encryption key informed in said management server information informing step and transmits the print job including the encrypted print data to the management server.

* * * * *